(12) United States Patent
Osterlund et al.

(10) Patent No.: US 10,771,396 B2
(45) Date of Patent: Sep. 8, 2020

(54) COMMUNICATIONS NETWORK FAILURE DETECTION AND REMEDIATION

(71) Applicant: Ooma, Inc., Sunnyvale, CA (US)

(72) Inventors: Karl Osterlund, San Jose, CA (US); Tobin E. Farrand, Burlingame, CA (US); William M. Gillon, San Mateo, CA (US); David A. Bryan, Cedar Park, TX (US); Arvind Vasudev, Sunnyvale, CA (US); Douglas E. Hart, San Jose, CA (US)

(73) Assignee: Ooma, Inc., Sunnyvale, CA (US)

(*) Notice: Subject to any disclaimer, the term of this patent is extended or adjusted under 35 U.S.C. 154(b) by 0 days.

(21) Appl. No.: 16/011,479

(22) Filed: Jun. 18, 2018

(65) Prior Publication Data

US 2018/0302334 A1 Oct. 18, 2018

Related U.S. Application Data

(63) Continuation-in-part of application No. 15/974,308, filed on May 8, 2018, which is a continuation of
(Continued)

(51) Int. Cl.
*H04L 12/28* (2006.01)
*H04L 12/911* (2013.01)
(Continued)

(52) U.S. Cl.
CPC .......... *H04L 47/74* (2013.01); *H04L 12/2801* (2013.01); *H04L 41/12* (2013.01);
(Continued)

(58) Field of Classification Search
None
See application file for complete search history.

(56) References Cited

U.S. PATENT DOCUMENTS

| 5,323,444 A | 6/1994 | Ertz et al. |
| 5,425,085 A | 6/1995 | Weinberger et al. |

(Continued)

FOREIGN PATENT DOCUMENTS

| CA | 2949211 C | 2/2019 |
| CA | 2954351 C | 4/2020 |

(Continued)

OTHER PUBLICATIONS

"International Search Report" and "Written Opinion of the International Searching Authority," dated Nov. 7, 2014 for App. No. PCT/US2014/044945, filed Jun. 30, 2014. 12 pages.

(Continued)

*Primary Examiner* — Anh Vu H Ly
(74) *Attorney, Agent, or Firm* — Carr & Ferrell LLP

(57) ABSTRACT

Systems and methods for communications network failure detection and remediation. Exemplary methods include: receiving first communications using a network from a first client, the first communications including an identifier for a user of the first client and a security credential of the user; authenticating the first user using the identifier and the security credential; creating, responsive to the authenticating, a registration for the first client in a registration database, the registration including an address for the first client, the registration being used to route second communications from a second client to the first client; establishing, responsive to the authenticating, a connection to the first client; detecting the connection has failed; and removing, responsive to the detecting, the registration from the registration database.

20 Claims, 13 Drawing Sheets

Related U.S. Application Data application No. 15/251,977, filed on Aug. 30, 2016, now Pat. No. 10,009,286, which is a continuation-in-part of application No. 14/708,132, filed on May 8, 2015, now Pat. No. 9,521,069.

(51) Int. Cl.
| | | |
|---|---|---|
| *H04L 12/919* | (2013.01) | |
| *H04L 12/24* | (2006.01) | |
| *H04L 29/08* | (2006.01) | |
| *H04L 12/26* | (2006.01) | |
| *H04L 12/841* | (2013.01) | |
| *H04L 29/06* | (2006.01) | |
| *H04L 12/703* | (2013.01) | |
| *H04L 12/707* | (2013.01) | |
| *H04L 12/741* | (2013.01) | |
| *H04L 12/751* | (2013.01) | |

(52) U.S. Cl.
CPC ...... *H04L 41/5019* (2013.01); *H04L 43/0811* (2013.01); *H04L 43/0882* (2013.01); *H04L 43/10* (2013.01); *H04L 43/50* (2013.01); *H04L 47/765* (2013.01); *H04L 67/141* (2013.01); *H04L 67/2838* (2013.01); *H04L 41/0213* (2013.01); *H04L 43/0852* (2013.01); *H04L 45/026* (2013.01); *H04L 45/22* (2013.01); *H04L 45/28* (2013.01); *H04L 45/74* (2013.01); *H04L 47/283* (2013.01); *H04L 69/14* (2013.01)

(56) References Cited

U.S. PATENT DOCUMENTS

| | | |
|---|---|---|
| 5,463,595 A | 10/1995 | Rodhall et al. |
| 5,519,769 A | 5/1996 | Weinberger et al. |
| 5,596,625 A | 1/1997 | LeBlanc |
| 5,598,460 A | 1/1997 | Tendler |
| 5,796,736 A | 8/1998 | Suzuki |
| 5,999,611 A | 12/1999 | Tatchell et al. |
| 6,023,724 A | 2/2000 | Bhatia et al. |
| 6,128,481 A | 10/2000 | Houde et al. |
| 6,148,190 A | 11/2000 | Bugnon et al. |
| 6,201,856 B1 | 3/2001 | Orwick et al. |
| 6,202,169 B1 | 3/2001 | Razzaghe-Ashrafi et al. |
| 6,266,397 B1 | 7/2001 | Stoner |
| 6,377,938 B1 | 4/2002 | Block et al. |
| 6,487,197 B1 | 11/2002 | Elliott |
| 6,594,246 B1 | 7/2003 | Jorgensen |
| 6,615,264 B1 | 9/2003 | Stoltz et al. |
| 6,661,340 B1 | 12/2003 | Saylor et al. |
| 6,690,932 B1 | 2/2004 | Barnier et al. |
| 6,697,358 B2 | 2/2004 | Bernstein |
| 6,714,545 B1 | 3/2004 | Hugenberg et al. |
| 6,775,267 B1 | 8/2004 | Kung et al. |
| 6,778,517 B1 | 8/2004 | Lou et al. |
| 6,778,528 B1 | 8/2004 | Blair et al. |
| 6,781,983 B1 | 8/2004 | Armistead |
| 6,914,900 B1 | 7/2005 | Komatsu et al. |
| 6,934,258 B1 | 8/2005 | Smith et al. |
| 7,113,090 B1 | 9/2006 | Saylor et al. |
| 7,124,506 B2 | 10/2006 | Yamanashi et al. |
| 7,127,043 B2 | 10/2006 | Morris |
| 7,127,506 B1 | 10/2006 | Schmidt et al. |
| 7,154,891 B1 | 12/2006 | Callon |
| 7,280,495 B1 | 10/2007 | Zweig et al. |
| 7,295,660 B1 | 11/2007 | Higginbotham et al. |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 7,599,356 B1 | 10/2009 | Barzegar et al. |
| 7,733,859 B2 * | 6/2010 | Takahashi ........... H04L 12/4625 370/351 |
| 7,844,034 B1 | 11/2010 | Oh et al. |
| 8,098,798 B2 | 1/2012 | Goldman et al. |
| 8,140,392 B2 | 3/2012 | Altberg et al. |
| 8,180,316 B2 | 5/2012 | Hwang |
| 8,208,955 B1 | 6/2012 | Nelson |
| 8,331,547 B2 | 12/2012 | Smith et al. |
| 8,350,694 B1 | 1/2013 | Trundle et al. |
| 8,515,021 B2 | 8/2013 | Farrand et al. |
| 8,577,000 B1 | 11/2013 | Brown |
| 8,634,520 B1 | 1/2014 | Morrison et al. |
| 8,837,698 B2 | 9/2014 | Altberg et al. |
| 8,988,232 B1 | 3/2015 | Sloo et al. |
| 9,087,515 B2 | 7/2015 | Tsuda |
| 9,147,054 B1 | 9/2015 | Beal et al. |
| 9,179,279 B2 | 11/2015 | Zussman |
| 9,225,626 B2 | 12/2015 | Capper et al. |
| 9,386,148 B2 | 7/2016 | Farrand et al. |
| 9,386,414 B1 | 7/2016 | Mayor et al. |
| 9,426,288 B2 | 8/2016 | Farrand et al. |
| 9,521,069 B2 | 12/2016 | Gillon et al. |
| 9,560,198 B2 | 1/2017 | Farrand et al. |
| 9,633,547 B2 | 4/2017 | Farrand et al. |
| 9,667,782 B2 | 5/2017 | Farrand et al. |
| 9,787,611 B2 | 10/2017 | Gillon et al. |
| 9,826,372 B2 | 11/2017 | Jeong |
| 9,905,103 B2 | 2/2018 | Hsieh |
| 9,929,981 B2 | 3/2018 | Gillon et al. |
| 10,009,286 B2 | 6/2018 | Gillon et al. |
| 10,116,796 B2 | 10/2018 | Im et al. |
| 10,135,976 B2 | 11/2018 | Farrand et al. |
| 10,158,584 B2 | 12/2018 | Gillon et al. |
| 10,192,546 B1 | 1/2019 | Piersol et al. |
| 10,255,792 B2 | 4/2019 | Farrand et al. |
| 10,263,918 B2 | 4/2019 | Gillon et al. |
| 10,297,250 B1 | 5/2019 | Blanksteen et al. |
| 10,341,490 B2 | 7/2019 | Im et al. |
| 10,469,556 B2 | 11/2019 | Frame et al. |
| 10,553,098 B2 | 2/2020 | Hart et al. |
| 2001/0053194 A1 | 12/2001 | Johnson |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0057764 A1 | 5/2002 | Salvucci et al. |
| 2002/0085692 A1 | 7/2002 | Katz |
| 2002/0130784 A1 | 9/2002 | Suzuki et al. |
| 2002/0133614 A1 | 9/2002 | Weerahandi et al. |
| 2002/0140549 A1 | 10/2002 | Tseng |
| 2002/0165966 A1 | 11/2002 | Widegren et al. |
| 2003/0027602 A1 | 2/2003 | Han et al. |
| 2003/0058844 A1 | 3/2003 | Sojka et al. |
| 2003/0099334 A1 | 5/2003 | Contractor |
| 2003/0119492 A1 | 6/2003 | Timmins et al. |
| 2003/0133443 A1 | 7/2003 | Klinker et al. |
| 2003/0141093 A1 | 7/2003 | Tirosh et al. |
| 2003/0158940 A1 | 8/2003 | Leigh |
| 2003/0164877 A1 | 9/2003 | Murai |
| 2003/0184436 A1 | 10/2003 | Seales et al. |
| 2003/0189928 A1 | 10/2003 | Xiong |
| 2004/0001512 A1 | 1/2004 | Challener et al. |
| 2004/0010472 A1 | 1/2004 | Hilby et al. |
| 2004/0010569 A1 | 1/2004 | Thomas et al. |
| 2004/0017803 A1 | 1/2004 | Lim et al. |
| 2004/0059821 A1 | 3/2004 | Tang et al. |
| 2004/0086093 A1 | 5/2004 | Schranz |
| 2004/0090968 A1 | 5/2004 | Kimber et al. |
| 2004/0105444 A1 | 6/2004 | Korotin et al. |
| 2004/0160956 A1 | 8/2004 | Hardy et al. |
| 2004/0235509 A1 | 11/2004 | Burritt et al. |
| 2005/0027887 A1 | 2/2005 | Zimler et al. |
| 2005/0036590 A1 | 2/2005 | Pearson et al. |
| 2005/0053209 A1 | 3/2005 | D'Evelyn et al. |
| 2005/0074114 A1 | 4/2005 | Fotta et al. |
| 2005/0078681 A1 | 4/2005 | Sanuki et al. |
| 2005/0089018 A1 | 4/2005 | Schessel |
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0169247 A1 | 8/2005 | Chen |

(56) References Cited

U.S. PATENT DOCUMENTS

| | | |
|---|---|---|
| 2005/0180549 A1 | 8/2005 | Chiu et al. |
| 2005/0222820 A1 | 10/2005 | Chung |
| 2005/0238034 A1 | 10/2005 | Gillespie et al. |
| 2005/0238142 A1 | 10/2005 | Winegarden |
| 2005/0246174 A1 | 11/2005 | DeGolia |
| 2005/0259637 A1 | 11/2005 | Chu et al. |
| 2005/0282518 A1 | 12/2005 | D'Evelyn et al. |
| 2005/0287979 A1 | 12/2005 | Rollender |
| 2006/0007915 A1 | 1/2006 | Frame |
| 2006/0009240 A1 | 1/2006 | Katz |
| 2006/0013195 A1 | 1/2006 | Son et al. |
| 2006/0059238 A1 | 3/2006 | Slater et al. |
| 2006/0071775 A1 | 4/2006 | Otto et al. |
| 2006/0092011 A1 | 5/2006 | Simon |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1 | 8/2006 | Chou et al. |
| 2006/0187900 A1 | 8/2006 | Akbar et al. |
| 2006/0206933 A1 | 9/2006 | Molen et al. |
| 2006/0243797 A1 | 11/2006 | Apte et al. |
| 2006/0251048 A1 | 11/2006 | Yoshino et al. |
| 2006/0258341 A1 | 11/2006 | Miller et al. |
| 2006/0259767 A1 | 11/2006 | Mansz et al. |
| 2006/0268828 A1 | 11/2006 | Yarlagadda |
| 2006/0268848 A1 | 11/2006 | Larsson et al. |
| 2007/0030161 A1 | 2/2007 | Yang |
| 2007/0032220 A1 | 2/2007 | Feher |
| 2007/0036314 A1 | 2/2007 | Kloberdans et al. |
| 2007/0037560 A1 | 2/2007 | Yun et al. |
| 2007/0037605 A1 | 2/2007 | Logan |
| 2007/0041517 A1 | 2/2007 | Clarke et al. |
| 2007/0049342 A1 | 3/2007 | Mayer et al. |
| 2007/0054645 A1 | 3/2007 | Pan |
| 2007/0061363 A1 | 3/2007 | Ramer et al. |
| 2007/0061735 A1 | 3/2007 | Hoffberg et al. |
| 2007/0067219 A1 | 3/2007 | Altberg et al. |
| 2007/0071212 A1 | 3/2007 | Quittek et al. |
| 2007/0118750 A1 | 5/2007 | Owen et al. |
| 2007/0121593 A1 | 5/2007 | Vance et al. |
| 2007/0121596 A1 | 5/2007 | Kurapati et al. |
| 2007/0132844 A1 | 6/2007 | Katz |
| 2007/0133757 A1 | 6/2007 | Girouard et al. |
| 2007/0135088 A1 | 6/2007 | Alessandro |
| 2007/0153776 A1 | 7/2007 | Joseph et al. |
| 2007/0165811 A1 | 7/2007 | Reumann et al. |
| 2007/0183407 A1 | 8/2007 | Bennett et al. |
| 2007/0203999 A1 | 8/2007 | Townsley et al. |
| 2007/0223455 A1 | 9/2007 | Chang et al. |
| 2007/0238472 A1 | 10/2007 | Wanless |
| 2007/0255702 A1 | 11/2007 | Orme |
| 2007/0283430 A1 | 12/2007 | Lai et al. |
| 2007/0298772 A1 | 12/2007 | Owens et al. |
| 2008/0016556 A1 | 1/2008 | Selignan |
| 2008/0036585 A1 | 2/2008 | Gould |
| 2008/0049748 A1 | 2/2008 | Bugenhagen et al. |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman, Jr. |
| 2008/0111765 A1 | 5/2008 | Kim |
| 2008/0118039 A1 | 5/2008 | Elliot et al. |
| 2008/0125095 A1 | 5/2008 | Mornhineway et al. |
| 2008/0125964 A1 | 5/2008 | Carani et al. |
| 2008/0144625 A1 | 6/2008 | Wu et al. |
| 2008/0144884 A1 | 6/2008 | Habibi |
| 2008/0159515 A1 | 7/2008 | Rines |
| 2008/0166992 A1 | 7/2008 | Ricordi et al. |
| 2008/0168145 A1 | 7/2008 | Wilson |
| 2008/0196099 A1 | 8/2008 | Shastri |
| 2008/0200142 A1 | 8/2008 | Abdel-Kader et al. |
| 2008/0205386 A1 | 8/2008 | Pumadi et al. |
| 2008/0225749 A1 | 9/2008 | Peng et al. |
| 2008/0247401 A1 | 10/2008 | Bhal et al. |
| 2008/0293374 A1 | 11/2008 | Berger |
| 2008/0298348 A1 | 12/2008 | Frame et al. |
| 2008/0309486 A1 | 12/2008 | McKenna et al. |
| 2008/0310599 A1 | 12/2008 | Pumadi et al. |
| 2008/0313297 A1 | 12/2008 | Heron et al. |
| 2008/0316946 A1 | 12/2008 | Capper et al. |
| 2009/0097474 A1 | 4/2009 | Ray et al. |
| 2009/0106318 A1 | 4/2009 | Mantripragada et al. |
| 2009/0135008 A1 | 5/2009 | Kirchmeier et al. |
| 2009/0168755 A1 | 7/2009 | Peng et al. |
| 2009/0172131 A1 | 7/2009 | Sullivan |
| 2009/0175165 A1* | 7/2009 | Leighton .......... H04L 29/06027 370/221 |
| 2009/0186596 A1 | 7/2009 | Kaltsukis |
| 2009/0213999 A1 | 8/2009 | Farrand et al. |
| 2009/0224931 A1 | 9/2009 | Dietz et al. |
| 2009/0240586 A1 | 9/2009 | Ramer et al. |
| 2009/0253428 A1 | 10/2009 | Bhatia et al. |
| 2009/0261958 A1 | 10/2009 | Sundararajan et al. |
| 2009/0264093 A1 | 10/2009 | Rothschild |
| 2009/0295572 A1 | 12/2009 | Grim, III et al. |
| 2009/0303042 A1 | 12/2009 | Song et al. |
| 2009/0319271 A1 | 12/2009 | Gross |
| 2010/0003960 A1 | 1/2010 | Ray et al. |
| 2010/0034121 A1 | 2/2010 | Bozionek |
| 2010/0046530 A1 | 2/2010 | Hautakorpi et al. |
| 2010/0046731 A1 | 2/2010 | Gisby et al. |
| 2010/0077063 A1 | 3/2010 | Amit et al. |
| 2010/0098034 A1 | 4/2010 | Tang et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0158223 A1 | 6/2010 | Fang et al. |
| 2010/0191829 A1 | 7/2010 | Cagenius |
| 2010/0195805 A1 | 8/2010 | Zeigler et al. |
| 2010/0215153 A1 | 8/2010 | Ray et al. |
| 2010/0220840 A1 | 9/2010 | Ray et al. |
| 2010/0229452 A1 | 9/2010 | Suk |
| 2010/0246781 A1 | 9/2010 | Bradburn |
| 2010/0261448 A1 | 10/2010 | Peters |
| 2010/0277307 A1 | 11/2010 | Horton et al. |
| 2010/0302025 A1 | 12/2010 | Script |
| 2011/0013591 A1* | 1/2011 | Kakumaru ......... H04W 36/0016 370/331 |
| 2011/0047031 A1 | 2/2011 | Weerasinghe |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0151791 A1 | 6/2011 | Snider et al. |
| 2011/0170680 A1 | 7/2011 | Chislett et al. |
| 2011/0183652 A1 | 7/2011 | Eng et al. |
| 2011/0208822 A1 | 8/2011 | Rathod |
| 2011/0265145 A1 | 10/2011 | Prasad et al. |
| 2011/0286462 A1* | 11/2011 | Kompella ............. H04L 45/18 370/395.53 |
| 2011/0320274 A1 | 12/2011 | Patil |
| 2012/0009904 A1 | 1/2012 | Modi et al. |
| 2012/0010955 A1 | 1/2012 | Ramer et al. |
| 2012/0027191 A1 | 2/2012 | Baril et al. |
| 2012/0035993 A1 | 2/2012 | Nangia |
| 2012/0036576 A1 | 2/2012 | Iyer |
| 2012/0047442 A1 | 2/2012 | Nicolaou et al. |
| 2012/0092158 A1 | 4/2012 | Kumbhar et al. |
| 2012/0099716 A1 | 4/2012 | Rae et al. |
| 2012/0167086 A1 | 6/2012 | Lee |
| 2012/0177052 A1 | 7/2012 | Chen et al. |
| 2012/0178404 A1 | 7/2012 | Chin et al. |
| 2012/0180122 A1* | 7/2012 | Yan .................. H04L 29/12028 726/15 |
| 2012/0213094 A1 | 8/2012 | Zhang et al. |
| 2012/0284778 A1 | 11/2012 | Chiou et al. |
| 2012/0320905 A1 | 12/2012 | Ilagan |
| 2012/0329420 A1 | 12/2012 | Loth et al. |
| 2013/0018509 A1 | 1/2013 | Korus |
| 2013/0024197 A1 | 1/2013 | Jang et al. |
| 2013/0035774 A1 | 2/2013 | Warren et al. |
| 2013/0052982 A1 | 2/2013 | Rohde et al. |

(56) References Cited

U.S. PATENT DOCUMENTS

| | | |
|---|---|---|
| 2013/0053005 A1 | 2/2013 | Ramer et al. |
| 2013/0070928 A1 | 3/2013 | Ellis et al. |
| 2013/0111589 A1 | 5/2013 | Cho |
| 2013/0136241 A1 | 5/2013 | Dillon et al. |
| 2013/0154822 A1 | 6/2013 | Kumar et al. |
| 2013/0162160 A1 | 6/2013 | Ganton et al. |
| 2013/0162758 A1 | 6/2013 | Shin |
| 2013/0214925 A1 | 8/2013 | Weiss |
| 2013/0229282 A1 | 9/2013 | Brent |
| 2013/0267791 A1 | 10/2013 | Halperin et al. |
| 2013/0272219 A1 | 10/2013 | Singh et al. |
| 2013/0288639 A1 | 10/2013 | Varsaysky Waisman-Diamond |
| 2013/0293368 A1 | 11/2013 | Ottah et al. |
| 2013/0336174 A1 | 12/2013 | Rubin et al. |
| 2014/0011470 A1 | 1/2014 | D'Amato et al. |
| 2014/0022915 A1 | 1/2014 | Caron et al. |
| 2014/0038536 A1 | 2/2014 | Welnick et al. |
| 2014/0066063 A1* | 3/2014 | Park ............... H04L 67/26 455/435.1 |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0129942 A1 | 5/2014 | Rathod |
| 2014/0156279 A1 | 6/2014 | Okamoto et al. |
| 2014/0169274 A1 | 6/2014 | Kweon et al. |
| 2014/0172953 A1 | 6/2014 | Blanksteen |
| 2014/0181865 A1 | 6/2014 | Koganei |
| 2014/0199946 A1 | 7/2014 | Flippo et al. |
| 2014/0206279 A1 | 7/2014 | Immendorf et al. |
| 2014/0207929 A1* | 7/2014 | Hoshino ............... H04L 63/08 709/223 |
| 2014/0222436 A1 | 8/2014 | Binder et al. |
| 2014/0253326 A1 | 9/2014 | Cho et al. |
| 2014/0266699 A1 | 9/2014 | Poder et al. |
| 2014/0273912 A1 | 9/2014 | Peh et al. |
| 2014/0273979 A1 | 9/2014 | Van Os et al. |
| 2014/0306802 A1 | 10/2014 | Hibbs, Jr. |
| 2014/0334645 A1 | 11/2014 | Yun et al. |
| 2014/0358666 A1 | 12/2014 | Baghaie et al. |
| 2015/0065078 A1 | 3/2015 | Mejia et al. |
| 2015/0071450 A1 | 3/2015 | Boyden et al. |
| 2015/0082451 A1 | 3/2015 | Ciancio-Bunch |
| 2015/0086001 A1 | 3/2015 | Farrand et al. |
| 2015/0087280 A1 | 3/2015 | Farrand et al. |
| 2015/0089032 A1 | 3/2015 | Agarwal et al. |
| 2015/0100167 A1 | 4/2015 | Sloo et al. |
| 2015/0117624 A1 | 4/2015 | Rosenshine |
| 2015/0138333 A1 | 5/2015 | DeVaul et al. |
| 2015/0145693 A1 | 5/2015 | Toriumi et al. |
| 2015/0177114 A1 | 6/2015 | Kapoor et al. |
| 2015/0200973 A1* | 7/2015 | Nolan ............... H04L 65/1069 709/228 |
| 2015/0221207 A1 | 8/2015 | Hagan |
| 2015/0229770 A1 | 8/2015 | Shuman et al. |
| 2015/0242932 A1 | 8/2015 | Beguin et al. |
| 2015/0244873 A1 | 8/2015 | Boyden et al. |
| 2015/0255071 A1 | 9/2015 | Chiba |
| 2015/0262435 A1 | 9/2015 | Delong et al. |
| 2015/0281450 A1 | 10/2015 | Shapiro et al. |
| 2015/0302725 A1 | 10/2015 | Sager et al. |
| 2015/0327039 A1 | 11/2015 | Jain |
| 2015/0334227 A1 | 11/2015 | Whitten et al. |
| 2015/0339912 A1 | 11/2015 | Farrand |
| 2015/0358795 A1 | 12/2015 | You et al. |
| 2015/0379562 A1 | 12/2015 | Spievak et al. |
| 2015/0381563 A1 | 12/2015 | Seo et al. |
| 2016/0006837 A1 | 1/2016 | Reynolds et al. |
| 2016/0012702 A1 | 1/2016 | Hart et al. |
| 2016/0036751 A1 | 2/2016 | Ban |
| 2016/0036962 A1 | 2/2016 | Rand |
| 2016/0066011 A1 | 3/2016 | Ro et al. |
| 2016/0078750 A1 | 3/2016 | King et al. |
| 2016/0117684 A1 | 4/2016 | Khor et al. |
| 2016/0142758 A1 | 5/2016 | Karp et al. |
| 2016/0150024 A1* | 5/2016 | White ............... H04L 45/70 709/203 |
| 2016/0173693 A1 | 6/2016 | Spievak et al. |
| 2016/0219150 A1 | 7/2016 | Brown |
| 2016/0232774 A1 | 8/2016 | Noland et al. |
| 2016/0248847 A1 | 8/2016 | Saxena et al. |
| 2016/0269882 A1 | 9/2016 | Balthasar et al. |
| 2016/0277573 A1 | 9/2016 | Farrand et al. |
| 2016/0300260 A1 | 10/2016 | Cigich et al. |
| 2016/0315909 A1 | 10/2016 | von Gravrock et al. |
| 2016/0323446 A1 | 11/2016 | Farrand et al. |
| 2016/0330069 A1 | 11/2016 | Nordmark et al. |
| 2016/0330108 A1 | 11/2016 | Gillon et al. |
| 2016/0330319 A1 | 11/2016 | Farrand et al. |
| 2016/0330770 A1 | 11/2016 | Lee et al. |
| 2016/0373372 A1 | 12/2016 | Gillon et al. |
| 2017/0021802 A1 | 1/2017 | Mims |
| 2017/0024995 A1 | 1/2017 | Gu et al. |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0034081 A1 | 2/2017 | Gillon et al. |
| 2017/0084164 A1 | 3/2017 | Farrand et al. |
| 2017/0104875 A1 | 4/2017 | Im et al. |
| 2017/0188216 A1 | 6/2017 | Koskas et al. |
| 2017/0270569 A1 | 9/2017 | Altberg et al. |
| 2017/0272316 A1 | 9/2017 | Johnson et al. |
| 2017/0293301 A1 | 10/2017 | Myslinski |
| 2017/0339228 A1* | 11/2017 | Azgin ............... H04W 8/00 370/389 |
| 2018/0005125 A1 | 1/2018 | Fadell et al. |
| 2018/0061213 A1 | 3/2018 | Morehead |
| 2018/0075540 A1 | 3/2018 | Bernard et al. |
| 2018/0152557 A1 | 5/2018 | White et al. |
| 2018/0262441 A1 | 9/2018 | Gillon et al. |
| 2018/0324105 A1 | 11/2018 | Gillon et al. |
| 2018/0365969 A1 | 12/2018 | Krein et al. |
| 2018/0375927 A1* | 12/2018 | Nozawa ............... H04L 67/1002 370/389 |
| 2019/0044641 A1 | 2/2019 | Trundle et al. |
| 2019/0045058 A1 | 2/2019 | Im et al. |
| 2019/0052752 A1 | 2/2019 | Farrand et al. |
| 2019/0190942 A1 | 6/2019 | Drummond et al. |
| 2019/0206227 A1 | 7/2019 | Farrand et al. |
| 2019/0222993 A1 | 7/2019 | Maheshwari et al. |
| 2019/0385435 A1 | 12/2019 | Farrand et al. |
| 2020/0105082 A1 | 4/2020 | Joao |
| 2020/0126388 A1 | 4/2020 | Kranz |
| 2020/0143663 A1 | 5/2020 | Sol |
| 2020/0168073 A1 | 5/2020 | Hart et al. |
| 2020/0186644 A1 | 6/2020 | White et al. |
| 2020/0219378 A1 | 7/2020 | Farrand et al. |

FOREIGN PATENT DOCUMENTS

| | | |
|---|---|---|
| EP | 2187574 A1 | 5/2010 |
| EP | 3050287 | 8/2016 |
| EP | 3146516 | 3/2017 |
| EP | 3167340 | 5/2017 |
| EP | 3295620 | 3/2018 |
| EP | 3050287 B1 | 12/2018 |
| EP | 3585011 A1 | 12/2019 |
| WO | WO2015041738 | 3/2015 |
| WO | WO2015179120 | 11/2015 |
| WO | WO2016007244 | 1/2016 |
| WO | WO2016182796 | 11/2016 |
| WO | WO2018044657 | 3/2018 |

OTHER PUBLICATIONS

"International Search Report" and "Written Opinion of the International Searching Authority," dated Jul. 27, 2015 for App. No. PCT/US2015/029109, filed May 4, 2015, 12 pages.

"International Search Report" and "Written Opinion of the International Searching Authority," dated Nov. 2, 2015 for App. No. PCT/US2015/034054, filed Jun. 3, 2015, 15 pages.

(56) References Cited

OTHER PUBLICATIONS

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.
"International Search Report" and "Written Opinion of the International Searching Authority," dated Jun. 30, 2016 for App. No. PCT/US2016/030597, filed May 3, 2016, 12 pages.
"Extended European Search Report," European Patent Application No. 14845956.3, dated Feb. 16, 2017, 8 pages.
"Office Action," Canadian Patent Application No. 2949211, dated Aug. 16, 2017, 4 pages.
"Office Action," Canadian Patent Application No. 2954351, dated Oct. 27, 2017, 3 pages.
"International Search Report" and "Written Opinion of the International Searching Authority," Patent Cooperation Treaty Application No. PCT/US2017/048284, dated Nov. 8, 2017, 8 pages.
"Extended European Search Report," European Patent Application No. 15796148.3, dated Jan. 8, 2018, 8 pages.
"Office Action," European Patent Application No. 14845956.3, dated Apr. 9, 2018, 4 pages.
"Extended European Search Report," European Patent Application No. 15818258.4, dated Feb. 26, 2018, 8 pages.
"Notice of Allowance," European Patent Application No. 14845956.3, dated Jul. 11, 2018, 7 pages.
"Notice of Allowance", Canadian Patent Application No. 2949211, dated Jul. 31, 2018, 1 page.
"Office Action," Canadian Patent Application No. 2954351, dated Aug. 22, 2018, 4 pages.
Vaidya, Govind, "Automatic Object Detection and Recognition via a Camera System", U.S. Appl. No. 16/163,521, filed Oct. 17, 2018, 40 pages.
"Partial Supplementary European Search Report," European Patent Application No. 16793194.8, dated Nov. 19, 2018, 10 pages.
"Extended European Search Report," European Patent Application No. 19187593.9, dated Nov. 13, 2019, 8 pages.
Takahashi et al. "A Hybrid FEC Method Using Packet-Level Convolution and Reed-Solomon Codes," IEICE Transaction on Communications, Communications Society, vol. E89-B, No. 8, Aug. 1, 2006. pp. 2143-2151.
"Office Action," European Patent Application No. 16793194.8, dated Jun. 9, 2020, 4 pages.
"Office Action," Canadian Patent Application No. 2924631, dated Jul. 14, 2020, 5 pages.
"Extended European Search Report," European Patent Application No. 16793194.8, dated Feb. 26, 2019, 9 pages.
"Notice of Allowance", Canadian Patent Application No. 2954351, dated Aug. 27, 2019, 1 page.
"Office Action," European Patent Application No. 157961483, dated Jan. 29, 2020, 6 pages.
"Office Action," European Patent Application No. 15818258.4, dated Jan. 31, 2020, 5 pages.

* cited by examiner

COMMUNICATIONS NETWORK FAILURE DETECTION AND REMEDIATION

CROSS REFERENCE TO RELATED APPLICATIONS

This application is a continuation-in-part of U.S. patent application Ser. No. 15/974,308, filed May 8, 2018, which is a continuation of U.S. patent application Ser. No. 15/251,977, filed Aug. 30, 2016 and issued Jun. 26, 2018 as U.S. patent Ser. No. 10/009,286, which is a continuation-in-part of U.S. patent application Ser. No. 14/708,132, filed May 8, 2015 and issued Dec. 13, 2016 as U.S. Pat. No. 9,521,069, the disclosures of which are incorporated by reference for all purposes.

TECHNICAL FIELD

The present technology relates generally to communications networks and more specifically to detection and remediation of network failures.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Communications networks can include a collection of nodes where transmission links are connected so as to enable communication between the nodes. The transmission links connect the nodes together. The nodes use circuit switching, message switching, or packet switching to pass the signal through the correct links and nodes to reach the correct destination terminal. Each node in the network usually has a unique address so messages or connections can be routed to the correct recipients. The collection of addresses in the network is called the address space.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for communications network failure detection and remediation. Specifically, a method for may comprise: receiving first communications using a network from a first client, the first communications including an identifier for a user of the first client and a security credential of the user; authenticating the first user using the identifier and the security credential; creating, responsive to the authenticating, a registration for the first client in a registration database, the registration including an address for the first client, the registration being used to route second communications from a second client to the first client; establishing, responsive to the authenticating, a connection to the first client; detecting the connection has failed; and removing, responsive to the detecting, the registration from the registration database.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
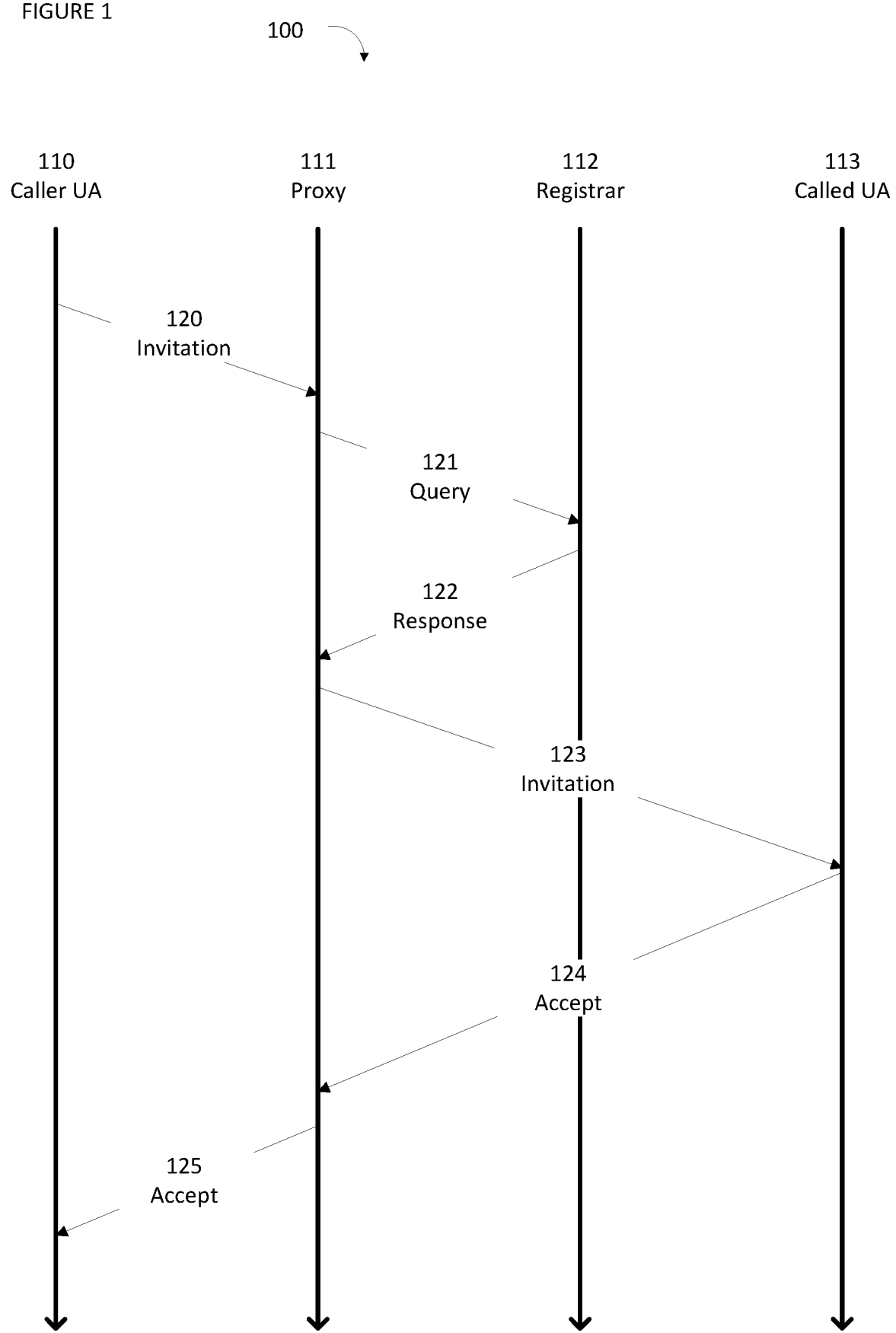
FIG. 1 is a simplified ladder diagram of a process for making a call, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, "mechanism" can refer to a process or method by which something takes place or is brought about, as well as an apparatus (to perform the process or method). As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Locating Users

For real-time communications, an important capability is enabling users to locate one another and communicate effectively using electronic conversations. These conversations are sometimes referred to as "calls," but the term "session" is frequently preferred to make clear that these communications may include capabilities besides simple voice, for example video, interactive media, device control, etc. In these systems, locating parties and determining if they are available for conversations is critically important. When calls are placed, location information is used to identify devices capable of handling calls on behalf of the users, and connecting those users.

For simplicity in discussion, the users in a conversation are often labeled based on which user initiates the conversation. For example, if a first user wishes to initiate a call to a second user, the first user will be referred to as the "caller" and the second the "called." Both the caller and the called connect to and interface with the system using one or more user devices. For example, the caller may have a desktop phone, and the called may have a desktop phone, a mobile phone, a video unit, and the like. User devices are generally two-way. That is, a user may place or receive calls or video sessions (which can include audio and video), and as such may be the caller or the called in any particular session, depending on which user chooses to initiate the conversation.

In some embodiments, the user location capability is logically distributed across many entities, which may or may not be physically combined in a number of ways. An example system is the IETF's Session Initiation Protocol (SIP). In SIP, the device(s) representing a user (e.g., the user's telephone, video unit, etc.) is referred to as a "user agent" or "UA." These UAs can communicate with a centralized entity called a "registrar" (e.g., a central telephony server) which maintains a list of "registrations." Registrations map a unique identifier for a (human) user to one or more UAs that may be used to reach that user.

The identifier may be a telephone number (e.g., 555-555-1212, for a North American telephone number), a SIP Uniform Resource Locator (URI) (e.g., sip: user@example.com), a telephone extension, a user name, or some other identifier appropriate for the scope of the system under discussion. Each registration takes the form of an identifier mapping to a list of the location(s) of one or more UAs that can be used to reach the user associated with that identifier. The location is most often in a form that includes one or more of an Internet Protocol (IP) address, IP port, transport protocol (UDP/TCP), and other networking information. When different networking technology is used, other information useful to make the connection may be used.

In some embodiments, the locations are not used directly by the UAs, but rather by another centralized network entity that works on their behalf. For example, for a call within an organization, the caller UA may not contact the registrar to obtain the address of the called UA (in order to contact it directly), but rather sends any requests to communicate to a SIP "proxy" server. On behalf the caller, the proxy contacts the registrar to obtain the caller's UA location and forwards ("proxies") the signaling information to the called's UA. In various embodiments, these two logical entities (the proxy and the registrar) are physically the same device (e.g., are on a common server or even common software application).

FIG. 1 is a ladder diagram 100 illustrating an example process of making a call. FIG. 1 shows the exchange of information between four entities—Caller UA 110, Proxy 111, Registrar 112, and Called UA 113. Time increases from the top of the figure toward the bottom. Note that FIG. 1 is a simplified representation of the messages exchanged into a logical flow, and does not limit messages which can be exchanged. For example, in SIP, multiple messages make up the acceptance of a request (accept 124) (e.g., TRYING, RINGING, OK, and ACK messages), some occurring prior to and some occurring at the moment the user of the UA indicates they would like to take the call. Similarly, in some cases the proxy may not be present and the UAs may directly contact the registrar. In other cases, multiple proxies may be involved (for example when a user of one organization contacts a user at another organization).

As the process begins, the user initiating the call instructs Caller UA 110 (the user's device) to place a call. For example, for a regular telephone, this would involve the user lifting the handset and dialing a number. As a result, Caller UA 110 generates one or messages required to initiate a conversation, "inviting" the remote party to a call, and passes these to proxy 111 at step 120.

Proxy 111 delivers this request to the UA working on behalf of the intended recipient of the call, the called. To locate this UA, Proxy 111 creates a query message, searching for the location(s) of the user identified in Invitation 120. As discussed above, this identifier could be a phone number, extension, SIP URI, or other identifier, and is provided by Caller UA 110 in Invitation 120. In the example of a regular phone call, the phone number dialed by the calling user is encoded by Caller UA 110 in Invitation 120. The query containing this identifier is forwarded to Registrar 112 at step 121. The registrar searches its database, and returns any matching records (locations) in Response 122. The response includes a location (e.g., IP address and/or similar or related information) needed to reach one or more UAs associated with that identifier.

Now equipped with a location(s) where the called's associated UA(s) can be reached, proxy 111 forwards the invitation 123 on to the Called UA 113. Note that multiple proxies and other call processing boxes may be involved, but are not shown for simplicity. Called UA 113 next alerts the corresponding user, for example by ringing a telephone.

In the example of FIG. 1, we will assume the user associated with Called UA 113 wishes to take the call and is present. When the user answers (e.g., by lifting the telephone receiver), the Called UA 113 generates one or more messages to indicate accepting the call at step 124, and sends these to Proxy 111, which forwards them to Caller UA 110 at step 125. (again, note that in SIP or other message protocol, multiple messages (in both directions) may be exchanged to actually establish the call and exchange relevant parameters, but the process is shown simply as the accept messages 124 and 125 for simplicity.

Registrations can, by their very nature, be ephemeral. Certain devices, for example portable devices, may move from one location (and network) to another, and in the process, the IP address for such devices changes. As an example, if a user is running an application on a tablet device that functions as a UA (such as a "soft" phone), the IP address at which that device can be reached will change when the user moves from the office network to home network or onto a mobile provider network. Similarly, devices may be powered off or lose connectivity (resulting in that device no longer being available), or be rebooted (potentially resulting in a different IP address). Additionally, it is often desirable that users can change devices, log in and out of devices, and otherwise have control over specifying which devices can be used to reach them, with minimal administrator involvement.

Thus, protocols such as SIP can specify that the devices themselves send registration messages to the registrar to populate the registration database, specifying the address(es)

that can be used to reach them, and incorporate expiry times for registrations, allowing older "stale" registrations to be removed.

When a UA is configured, the user inputs their identifier, as well as the location (e.g., IP address) that can be used to reach the registration server. For example, a user may configure a hardware-based telephone or a software application softphone by entering their phone number and the address of the registrar server (often the same server as the proxy that phone will use, although if not both addresses may need to be provided). Additionally, the user typically provides some security credentials (e.g., a password or certificate) associated with the identifier to prevent random individuals from asserting they should be reached when an identifier (e.g., phone number) is contacted. This information also may be entered into a record stored on a configuration or provisioning server, and the device will contact this server to obtain the configuration information.

Equipped with this information, the UA sends a registration message to the registrar, containing the user's identifier and credentials asserting access to that identifier, along with the IP address(es) of the UA. In this message the UA also specifies a preferred expiry time for the registration. Upon receiving this message, the registrar verifies the credentials (optionally rejecting the message if the credentials are invalid or not present), and creates a registration mapping in the registration database, associating the user's identifier with the supplied address. The registrar will consider the registration expiry time provided by the UA, and if it is acceptable to the registrar, the current time plus this time will be used to determine how long the registration is valid. If the time is unacceptable (i.e., too long or too short, based on registrar policy), the registrar may accept the registration, but substitute an alternate expiry time of its own, which it then sends back to the UA in a message. The registrar may also reject the registration if the time is unacceptable, optionally providing information about what an acceptable time would be. In contemporary deployments, expiry times vary, with times such as 3600 seconds (one hour), 1800 seconds (half an hour) or 600 seconds (10 minutes) being common.

The UA can a resend registration messages refreshing the registration periodically, with a period slightly less than the expiry time. For example, if the expiry time is 3600 seconds, the UA may re-register after 3580 seconds have passed. This allows the registrar to know the device is still active and able to receive calls on behalf of the user.

If a user's UA device leaves the network in a "clean" way—for example by the user logging out, exiting, or cleanly powering the device down—the UA can send a message to de-register. In SIP, for example, a new registration message is sent to the registrar with the user's identifier, credentials, the address of the UA, and an expiry time of zero. Upon acceptance by the registrar (after verifying credentials), the registrar will remove the registration. Note that this generally removes only the registration for this device. That is, if the user has two devices registered, only the one being powered down will de-register.

In some embodiments, however, a UA device will no longer be reachable or available but will not cleanly leave and will not de-register. There are many reasons this could occur. In the case of a network failure between the servers and the UA, the UA may no longer be able to connect to the servers to place calls, and the servers will not be able to direct inbound calls to the UA. A device may be unplugged, without sending a de-register message. A user may close the cover of a laptop, hibernating the device. When the device hibernates, a software UA (softclient) running on this laptop would stop suddenly, rendering the softclient unreachable. A device may also move from one network to another without being shut down or cleanly exiting. As an example, a softclient running on a tablet or laptop may be moved from the office to home, changing the network information, including IP address, without the softclient being aware. In this case, because the tablet's IP address changed, the earlier registration is no longer valid.

Virtual Private Networks

According to some embodiments, users and/or their devices are connected to remote servers over a virtual private network or VPN. A VPN is a network construct that provides access to a central network to a remote device, making it function as though that remote device were present on the central network.

In some VPN deployments, the remote device is assigned an IP address on and managed by the central network. Traffic from the device is delivered back to the central network via the VPN. This is typically accomplished by tunneling traffic from the remote device using special protocols back to the central network via a VPN server connected to the central network. The VPN server then delivers the traffic back to the central network. Because the address of the remote device is managed by the central network, this remote traffic from the remote device appears to other devices on the central network to originate from another (trusted) device the central network. Similarly, any traffic sent to the remote device using the central network managed address will be delivered to the VPN server, then relayed to the remote device, again making it appear to be located directly on the central network. This allows a device that is located remotely to participate if it was physically connected to the central network. In a corporate use case, this means a home user's device appears to be connected to a corporate network, with all the access and capabilities that provides.

The VPN server can require credentials from the user before allowing a device to connect to the VPN, preventing unauthorized devices from joining the central network. Similarly, traffic over the VPN (tunnel) is often encrypted, ensuring the information from the central network is not leaked to remote devices.

Detecting and Responding to Network Failures

According to various embodiments, mechanisms for determining that a network between a provider and the provider's customers has failed or degraded can be used. When a failure or degradation is detected, one or more variables are set, indicating the failure or degradation. In parallel, a mechanism monitors these variables, and takes appropriate pre-defined actions when one or more variables indicates that that action should occur.

Detection of the failure, as well as the response to the failure being detected, may occur either internally to the customer's network (e.g., on a device connected to the customer network) or externally. Here, the customer can be a home or commercial end-user. The detection may also occur externally to the customer's network. In some cases, the failures or degradation may be detected by equipment operated by a service provider offering a particular service to the customer, for example a communications service, monitoring of Internet connected devices, or a streaming service. The failure or degradation may also by detected by the customer's ISP (Internet Service Provider), an intermediary network provider, or the provider of service to the service provider.

Figure 2:
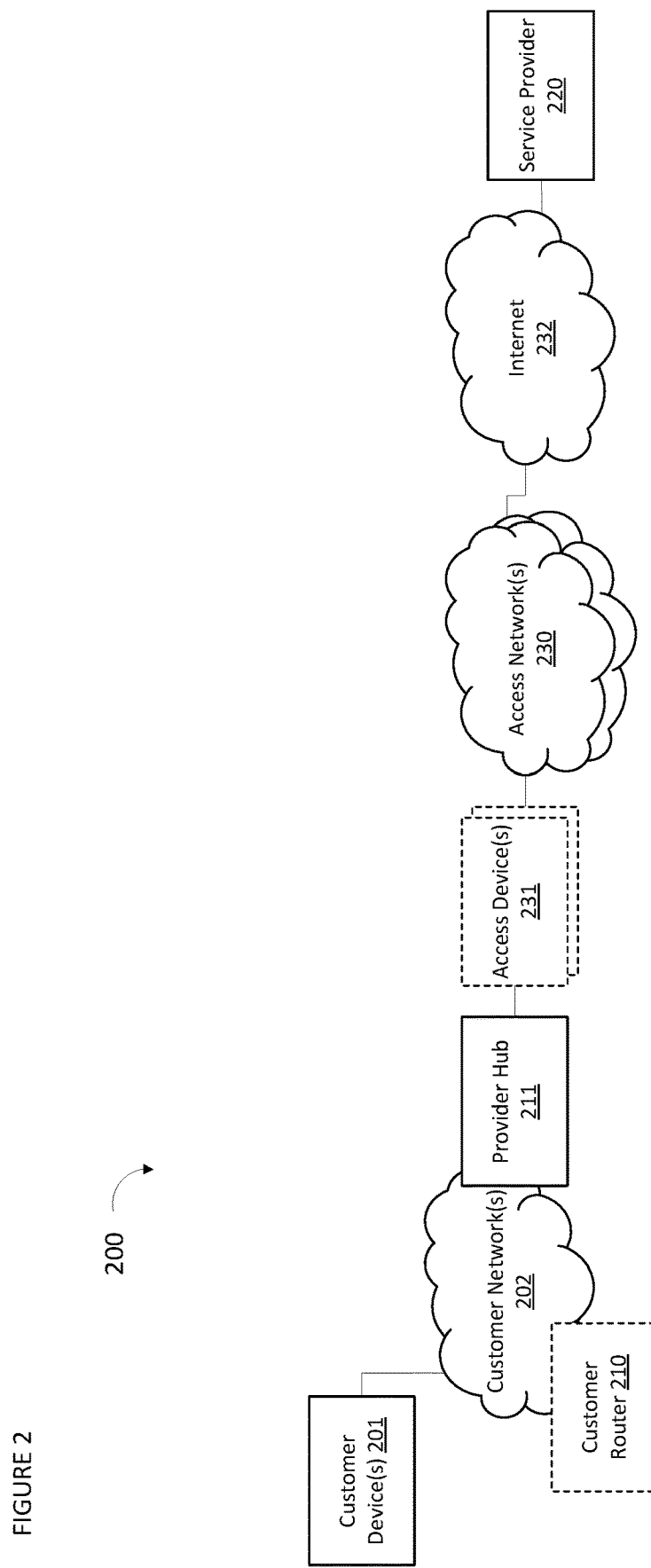
FIG. 2 is simplified block diagram of a network, according to various embodiments.

FIG. 2 is a simplified block diagram of network 200 connecting a customer (consumer or enterprise) to a service provider. The customer accesses and uses the network via one or more Customer Devices 201. For example, the customer may have computers, tablets, smartphones, or other consumer devices. These devices connect to one or more Customer Network(s) 202. Note that Customer Network(s) 202 may take several forms, including wired Ethernet networks, Wireless (Wi-Fi) networks, DECT networks, ZigBee networks, Bluetooth networks, or other network types.

Customer Network(s) 202 can be produced and/or controlled by optional Customer Router 210 and/or a Provider Hub 211. Optional Customer Router 210 is a home router device, which is used to allow multiple devices to interface with and use a network connection provided to the customer's ISP. These devices provide access internally using one or more network technologies (e.g., wired Ethernet, Wi-Fi, etc.), typically also provide other capabilities such as firewall, network address translation (NAT), filtering, security, etc.

Provider Hub 211 can be a device provided and/or managed by a Service Provider 220. Provider Hub 211 can provide access to services offered by the service provider, either by the consumer directly interacting with the device, or via one or more of the Customer Devices 201. In some embodiments, the service provider offers communications services (e.g., telephony and/or video services), and the provider hub enables communications devices (telephone handsets, video devices, etc.) on the premises to connect to the service offered by the service provider. In the example case of a communications provider, the provider hub may have connections to allow analog telephone devices, or DECT wireless telephone devices in the premises (Customer Devices 201) to connect to and use the services of the service provider, as well as devices (Customer Devices 201) connecting over computer network connections (e.g., Ethernet, Wi-Fi, etc.)

In addition to these services, the provider hub 211 can include many or all of the capabilities of Customer Router 210, such as providing network access over one or more access technologies, providing security and/or firewall services, etc. As such, in some deployments the customer router is not necessarily needed and the provider hub instead provides these services.

In this example, the Provider Hub 211 is connected to one or more Access Network(s) 230 to reach the Internet 232 (and on to Service Provider 220 via the service provider network, not shown). Optionally, one or more Access Device(s) 231 may be required between the provider hub and the access network. For example, the network service for the customer is provided by a cable company ISP, and the access device takes the form of a cable modem. In another non-limiting example, the access network is a cellular network, for example an LTE network, and the access device is a modem to connect to this network. In a further example, the access device is a consumer device featuring a network connection which it can share with other devices. For example, a mobile phone may share its broadband connection with provider hub and/or consumer router as a network connection.

Optionally, Access Device(s) 231 may not be needed if the components of these devices are integrated directly into Provider Hub 211 and/or Customer Router 210. Note further that any combination of stand-alone access device or similar technology integrated into the provider hub or consumer router may be employed (e.g., a stand-alone access device in the form of a cable modem is connected to the provider hub, and additionally the provider hub features integrated hardware allowing access to a wireless LTE network).

In some examples, multiple Access Network(s) are supported simultaneously for reliability, cost-savings, security, or other reasons. For example, the deployment described above would incorporate a connection using a cable provider ISP network, and an LTE wireless connection. Additional connections are possible, for example a third connection could be provided over a satellite network.

Figure 3:
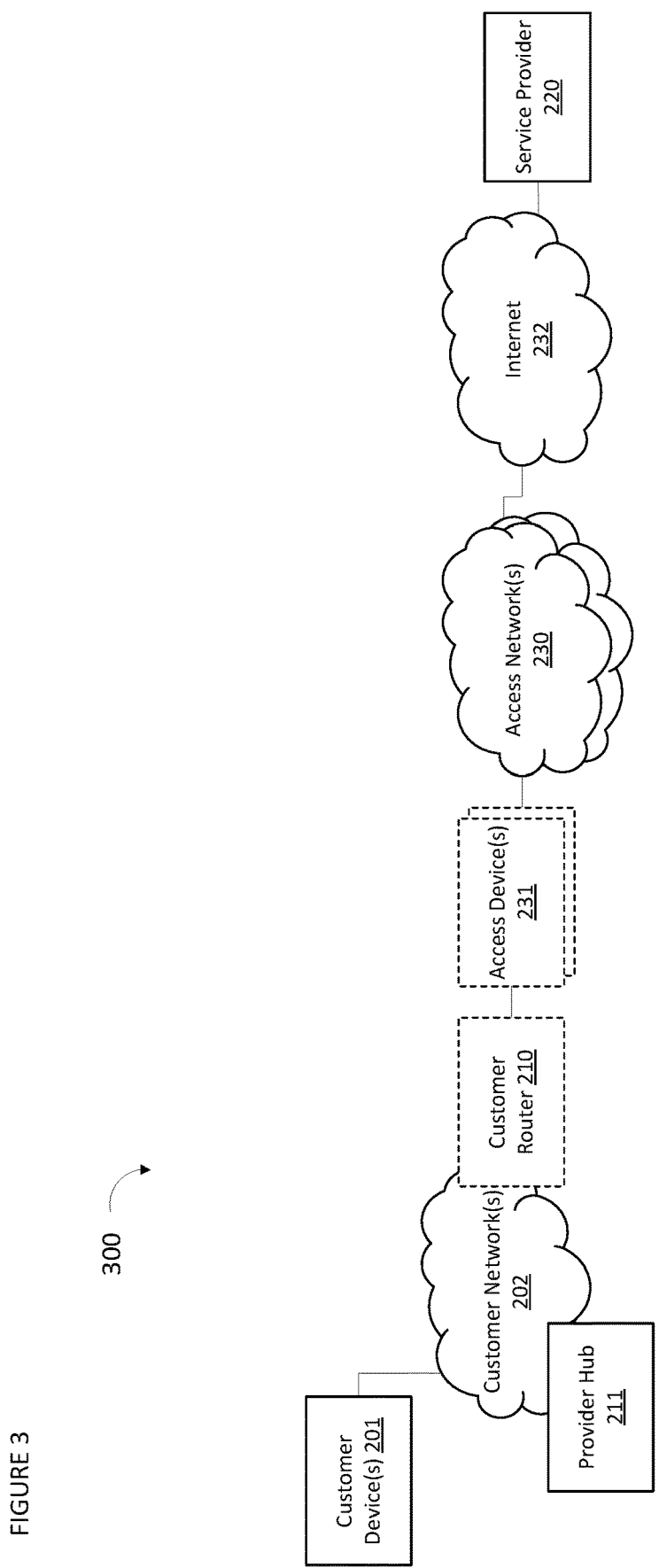
FIG. 3 is simplified block diagram of a network, in accordance with some embodiments.

In FIG. 2, Customer Router 210 is shown connected to Access Network(s) 230 via Provider Hub 211 (that is, the customer router is "inside" of the provider hub relative to the access network). Other architectures are possible. FIG. 3 illustrates an architecture 300 where the customer router and provider hub are reversed, with the provider hub instead connecting to the access networks via the customer router (that is, the provider hub being "inside" of the customer router relative to the access network).

Figure 4:
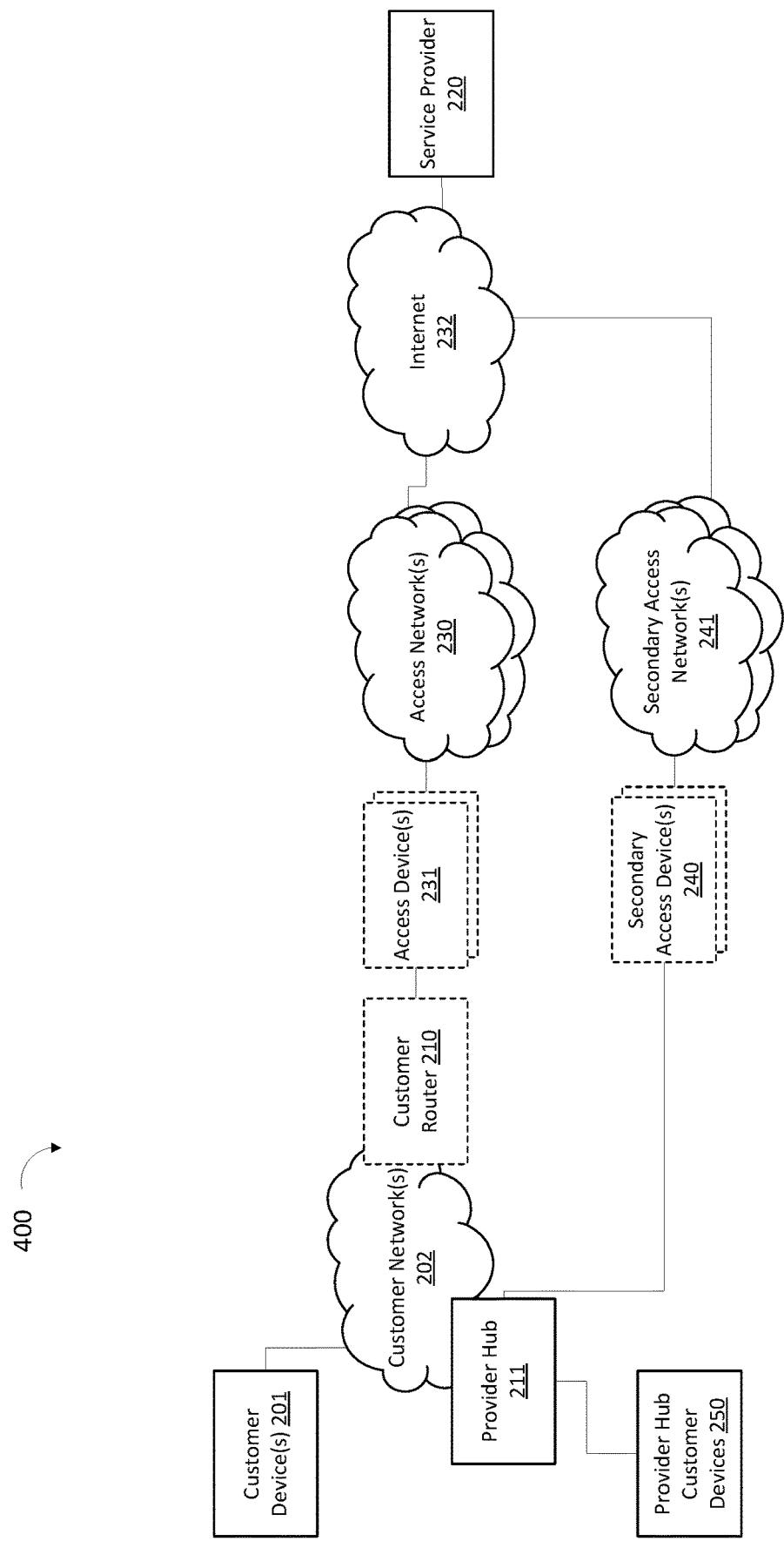
FIG. 4 is simplified block diagram of a network, in accordance with various embodiments.

In various embodiments, one of devices Provider Hub 211 and Customer Router 210 may be "behind" the other with respect to one network, but also connected directly to one or more access networks directly. FIG. 4 illustrates a network 400 where this situation occurs. In this case, the provider hub is "behind" the customer router with respect to the primary network (Access Networks 230 via Access Device(s) 231), but also has its own connection to Internet 232 via optional Secondary Access Device(s) 240 and Secondary Access Network(s) 241. In this case, some Customer Device(s) 201 may be connected to the customer router while others (Provider Hub Customer Devices 250) are connected via the provider hub. In this scenario, secondary network access via the secondary access network may be available only to provider hub customer devices, and not to customer devices. An analogous situation exists if Customer Router 210 accesses the primary network via Provider Hub 211, while accessing its own secondary network directly. As in FIG. 2, Secondary Access Device(s) 240 may not be required if access capabilities are integrated into Provider Hub 211.

In some embodiments, Secondary Access Network(s) 241 is an LTE and/or other wide area wireless network connection, and Secondary Access Device(s) 240 is integrated into Provider Hub 211. Other topologies can be used. For example, Provider Hub 211 connecting to the primary network, but Customer Router 210 connecting to its own secondary network.

According to some embodiments, failures or degradations in the network are detected through the mechanisms discussed below. If through one of these mechanisms ("monitoring") a network is determined to have failed or to have degraded beyond on specific criteria defined below, variables are set, and when the appropriate set of variables are set indicating the failure, one or more pre-defined actions are taken in response to the variables having been set.

By way of non-limiting example, Provider Hub 211 is a home hub, and may be used for failure detection. By way of further non-limiting examples, detection can also be performed by a freestanding, external measurement device on the home network; by Customer Router 210; by one of Customer Devices 201 or software operating on a Customer Device; by Access Device(s) 231; and/or by remote measurement in cooperation with devices at Service Provider 220. In some cases, a combination of two or more of the above example devices is used to obtain the network measurements used to determine if the network has failed.

Note that while the two processes (monitoring/setting variables and taking actions) are logically shown as separate processes (here in process 500 in FIG. 5 and system 700 in FIG. 7), these may occur simultaneously/concurrently, with actions being taken directly. Similarly, while each of the two processes is shown as being a single process, each may be further composed of several sub-processes which collectively deliver the capability of monitoring/setting variables and taking actions.

Figure 5:
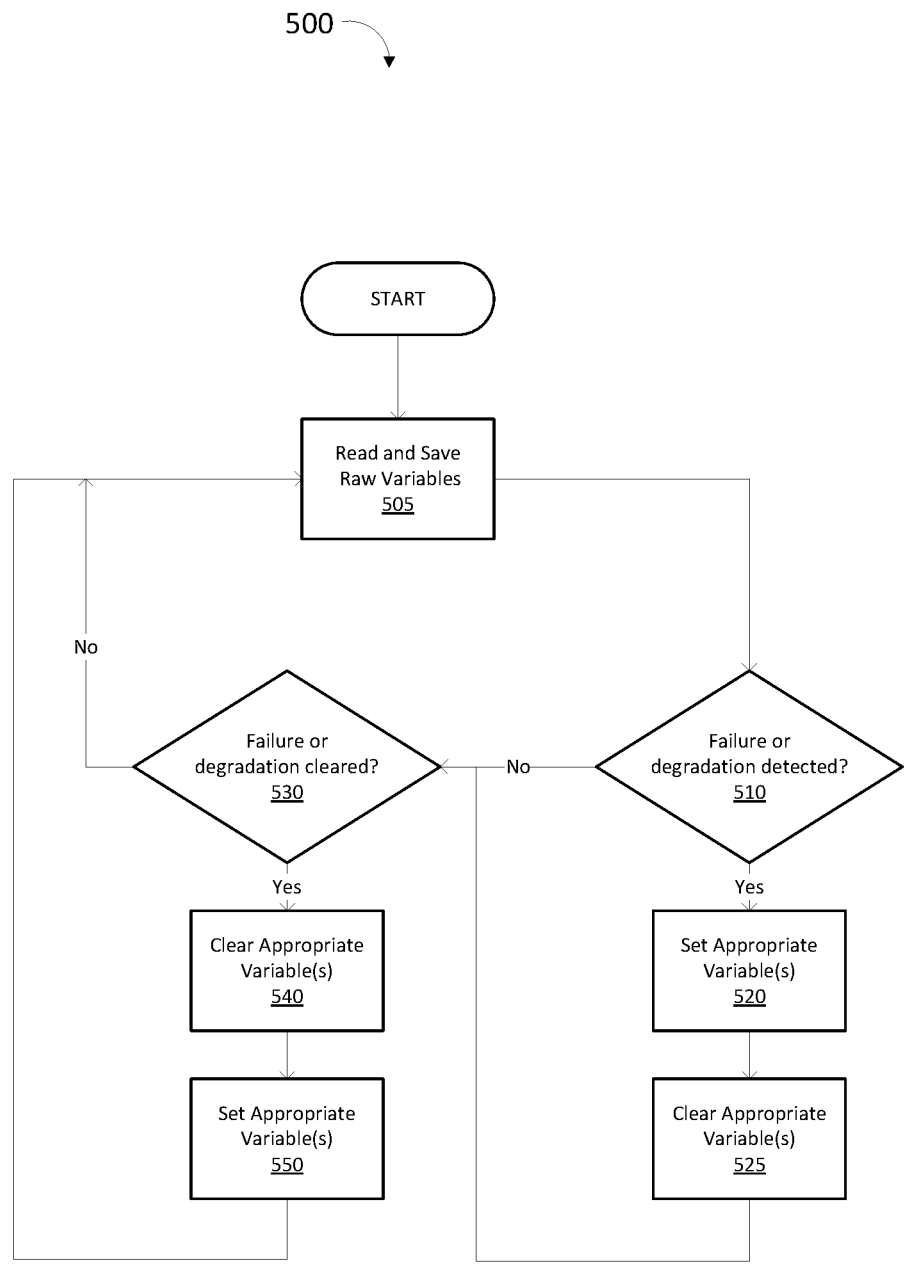
FIG. 5 is simplified flow diagram of a method for monitoring, according to some embodiments.

FIG. 5 shows a simplified flow diagram of a process 500 for setting these variables. At step 505, raw variables are read and saved and/or cleared without any processing. For example, while some variables may be set to indicate that a failure has occurred, at step 505, variables are saved with raw measured values. This allows entities taking actions (later) to access raw data without any interpretation by the entity measuring the network information, if required.

At step 510 it can be determined if a failure or degradation is indicated (for example, a network failure). This is determined by examining one or more variables to determine if they have degraded beyond a specified criteria. Specific metrics or conditions for determining failure or degradation are outlined below. If at step 510 it is determined that a failure or degradation has not occurred, processing moves to step 530 to see if a failure or degradation has cleared (and returns to step 505 where the measurements continue to be performed and the status of the network continues to be monitored.) The monitoring process may be continuous, polling-based, triggered by an event, or some other mechanism.

If a failure or degradation is detected at step 510, zero or more variables with more information about the degradation or failure may be set at step 520. The variable may include information about the nature of the failure or detected degradation, the severity of the failure, the location where the failure was detected, the entity that detected the failure, etc. In some cases, the variable may not be set due to other conditions (e.g., a measurement that would normally cause a failure flag to be set is overridden by a flag indicating the measurement is suspect of the network is under maintenance). Multiple variables may be set if the condition causes multiple failure types, has occurred at multiple locations, etc.

At step 525, variables may be cleared in response to the degradation or failure. That is, if some variables previously had been set reflecting a different (for example better) state of the network prior to the detection of the failure or degradation, these may be cleared here.

After checking if a failure or degradation has occurred, flow moves to step 530, where it is determined if a failure or degradation has been resolved. If a situation has not resolved (a change of state), processing returns to 505 where monitoring continues to determine if a problem has occurred or been resolved.

If a failure or degradation condition has been resolved, this is detected at step 530, and flow continues at step 540. At 540, variable(s) set at step 520 are cleared. Additionally, at step 550 other variable(s) may be set or cleared in response to the network issue resolving itself. These variables may be analogous to those cleared in step 525. After completion of this action, the process can return to the beginning (step 505) and restart.

More than one instance of process 500 may be running simultaneously/concurrently, monitoring for different network metrics that may trigger setting (or clearing) of variables associated with different network failures or degradations. That is, one process may monitor for loss of connectivity, and set corresponding variables, while another process may simultaneously monitor for high latency, yet another may monitor for high rates of packet loss, etc.

Additionally, instances of process 500 may be performed in multiple different locations on multiple devices; on customer side equipment (e.g., Customer Device(s) 201, Customer Router 210, Provider Hub 211, or Access Device(s) 231); on intermediary network devices (e.g., devices constituting Access Network(s) 230 or Internet 232); and/or on devices located at Service Provider 220. Any of these instances may set or clear appropriate variables.

Figure 6:
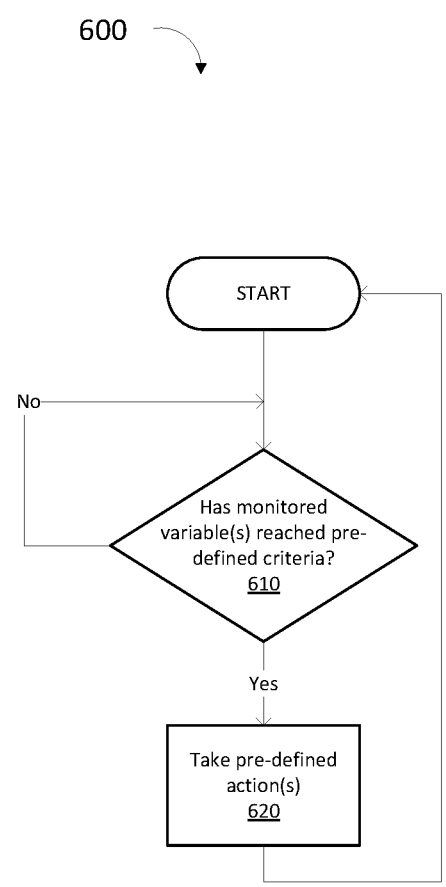
FIG. 6 is simplified flow diagram of a method for monitoring, according to various embodiments.

FIG. 6 shows a simplified flow diagram for a process 600 for monitoring and responding to variable(s) set or cleared by process 500 by taking a pre-defined action. At step 610 it is determined if variables which are being monitored have reached pre-defined criteria. This may be a variable being set or cleared; exceeding or falling below a certain value; or being set, cleared or reaching some value in combination with other variables.

At step 610 it is determined whether one or more monitored variable(s) have reached the defined criteria. If they have, the process 600 continues at step 620 where the pre-defined action(s) (described in more detail below) are taken in response. If monitored variables have not reached the pre-defined criteria, flow returns to step 610 for further monitoring.

Numerous instances of process 600 may be running simultaneously/concurrently, monitoring different variable(s) and/or using different criteria that may trigger taking a pre-defined action in response to the change in variables. That is, one process may take one action when a monitored variable indicates loss of connectivity, and another may take a different action when connectivity returns. As with process 500, many variable(s) or combinations of variable(s) may be monitored, with different actions associated with different sets or values of variable(s).

Additionally, as with process 500, instances of process 600 may be performed in multiple different locations on the customer side equipment (e.g., Customer Device(s) 201, Customer Router 210, Provider Hub 211, or Access Device(s) 231); may be performed by intermediary network devices (e.g., devices constituting Access Network(s) 230 or Internet 232); and/or may be performed on devices located at Service Provider 220. Any of these instances may take pre-defined responses in response to changes in monitored variable(s).

Note that because the criteria defined at step 610 can include detecting whether variables have been cleared, no analogous step is included for when the network returns to the original state—that is handled by setting and/or clearing variables—which will be responded to by different instances of process 600 monitoring those variables to reach certain criteria which indicate the network has returned to proper functionality.

Types and Consequences of Network Failures

Failures of network connectivity may occur at several different levels within the network, or may manifest as failures of different services (e.g., a particular service may fail even when basic network connectivity still operates). Failures at different levels or of different services may result in different actions being taken to deal with the failure. Colloquially, we refer to the failures defined by what has failed from the point of view of the remote location (e.g., in FIG. 2 from the point of view of the Customer Devices 201 or from Provider Hub 211 attempting to reach Service Provider 220), and identify these levels within the network based on where failures can occur.

Connectivity failures can manifest themselves as an inability to establish a connection between network-enabled devices or services, or an inability to deliver packets (or frames, segment, datagram, or other terms used for sections of data delivered between devices). Connectivity failures refer to failure of the actual network layer (or lower) connection. This may be because devices on the network are no longer connected to one another physically, for example due to a failed device or the network connection being physically severed. This failure may also be the result of a hardware failure of a device at the link or network levels, causing a failure of packets to be delivered within the network or outside of the network, despite physical connections being sound and all devices being operational. Failure may also occur even with fully functional devices and network links, due to misconfiguration of devices; overload (resulting in dropped packets); security, administrative, or accounting controls; or other conditions that preclude delivery of packets.

Failure may occur in several locations. For example, in the architecture presented in FIG. 2, failure of any of Customer Router 210, Provider Hub 211, Access Device(s) 231, or any device within Customer Network(s) 202, Access Network(s) 230, or Internet 232 may cause a connectivity failure.

DNS failures refer to the loss of Domain Name Service (DNS). DNS translates human-readable domain and hostnames (e.g., www.ooma.com) to IP addresses (e.g., 192.230.64.10, 192.230.65.10, etc.), enabling human users to define where packets should be sent. In this failure mode, packets are delivered properly if the IP address is already known. However, the system is of limited use to users themselves, because they cannot translate human-readable hostnames into IP addresses that can be used by the devices to make network connections and deliver packets (e.g., the role of DNS).

In a third-party failure, tests to see if one or more third-party network sites can be reached fail. Here, third-party refers to a party that is not the consumer or service provider. For example, tests may be performed to see if major web sites, network providers, or consumer sites are reachable. Failure to reach one (or more convincingly, multiple) third party sites, in the absence of a Connectivity of DNS failure is a strong indication that something in the network connection is not functioning properly or is misconfigured.

Failure to reach a desired network service (e.g., the service provided by service provider 220 in FIG. 2), in the absence of the failures listed above (e.g., Connectivity, DNS, and Third-Party), likely (although not certainly) indicates that that particular service, rather than the network, has failed. For example, if the network appears to be working from a connectivity and DNS perspective, and multiple third-party systems can be reached, failure to reach the service provider likely indicates the service provider or the service provider's network has failed.

Loss of connectivity can result in numerous issues for an end-user. Obviously, the end-user is deprived of the use of the network for ordinary actions, such as web surfing, exchanging email, using messaging services, streaming media, and other such uses, but a number of particular issues may be more serious for the end-user.

For communications systems (e.g., Voice over Internet Protocol (VoIP)), an additional issue presents itself. Outbound communication sessions, that is, those originated from the end-user who has no or reduced network connectivity will obviously fail, but inbound communications intended for the end-user also present a challenge.

As described above, in a SIP deployment a service provider offering service to an end-user, a registration is used to map a unique identifier for the user (e.g., a phone number, user name, URI, or similar) to a location where the user can be reached (e.g., an IP address). As described above, a traditional SIP registration has an associated expiry time, typically 3600 seconds. If the end-user is unreachable for some reason (for example, because the connection between the service provider and the called end-user has failed, because the end-user equipment has failed, etc.), the service provider may still attempt to deliver the call, only realizing the caller is unavailable after the attempt fails. This may involve lengthy network timeouts, inconveniencing the caller or leading to situations where it is unclear if the call is able to complete.

Other protocols used for communications use mechanisms slightly different than the SIP architecture, but typically with analogous notions of registration allowing a user to be reached by finding the user's unique identifier and mapping that to an address or addresses where the user may be reached. One novel example alternate mechanism for registration is described below.

As an increasing number of devices have become network-aware and/or network-enabled, the network has become more critical to the consumer. Home security devices such as cameras and sensors depend on the ability to stream information to an offsite location. Internet enabled doorbells which enable the user to monitor visitors even when not home are of limited use without the network connection. Home or office automation devices that allow control of environmental controls such as temperature and lighting often are triggered as occupants near the structure, but if the network is unavailable, this information may not be communicated to the system. Other conveniences, such as network-enabled cooking devices that can be activated when heading home are of limited use if they cannot be communicated with remotely. These technologies may be collectively referred to as the Internet of things (IoT). The IoT can include a network of physical devices, vehicles, home appliances, and other items embedded with electronics, software, sensors, actuators, and connectivity which enables these objects to connect and exchange data.

Detecting Failure

FIG. 5 depicts a simplified flow diagram for a generalized method 500 for monitoring and setting or clearing variables in response to detecting the occurrence or resolution of degradation or failure. The various mechanisms that may be used to detect the failures are described further below. That is, various detection mechanisms which can be used in FIG. 5 are disclosed. Actions/remediation taken in response to the variable(s) being set or cleared are explained later below.

As discussed above, failures may be detected either by components of and/or device(s) in the Service Provider 220, customer side component and/or device(s), by intermediary devices, and/or by third party devices. Each party may set variables and take actions in response to these variables.

Figure 7:
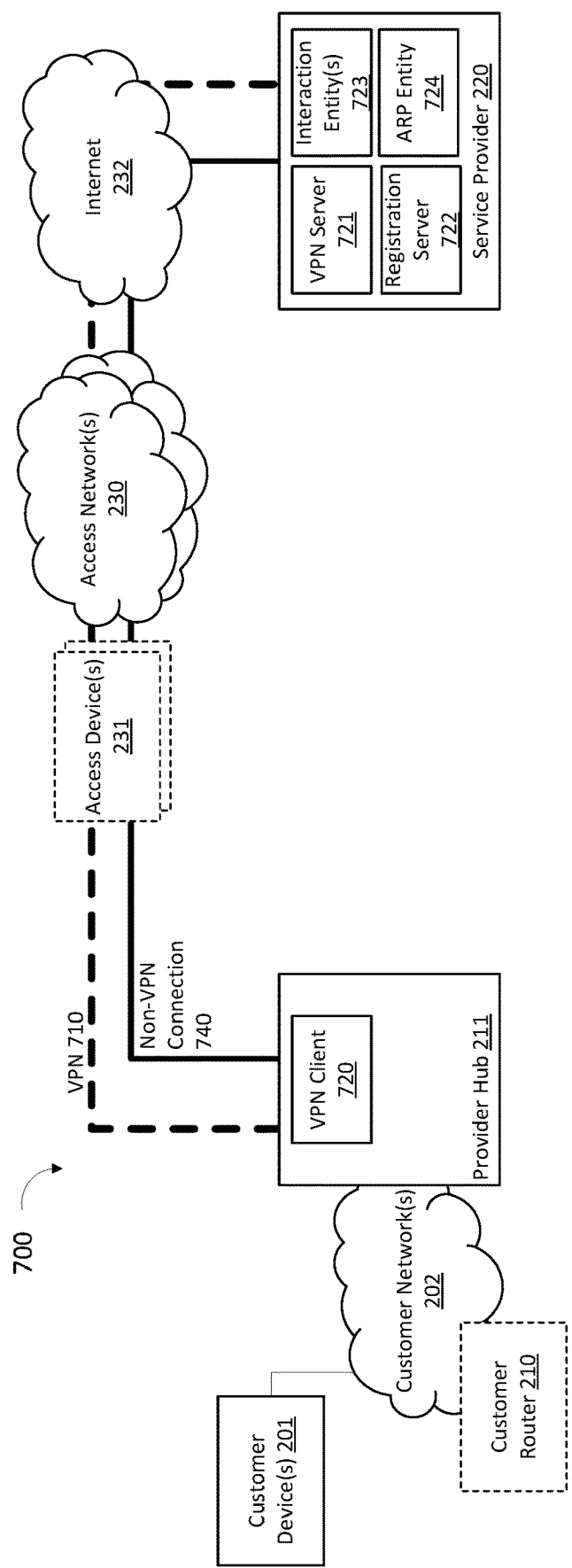
FIG. 7 is simplified block diagram of a network, in accordance with some embodiments.

FIG. 7 illustrates a network diagram for deployment 700, where end-user devices connect to a service provider. FIG. 7 shows further details of parts of network 200, illustrating Provider Hub 211 connected to a Service Provider 220 either over VPN 710, or over Non-VPN Connection 740. FIG. 7 further illustrates details of components within Provider Hub 211 and Service Provider 220.

Among other failure conditions addressed, embodiments of the present invention use traffic other than the registrations flowing between a remote device and a central network to detect abnormalities in the connection, and to inform the registrar of failures of a remote communications device before the registration expires. This may be accomplished directly, for example by sending the registrar a message, or by setting a variable indicating one or more factors indicates a network failure.

Such detection of abnormalities can lead to early detection of unavailability of the remote/other party. When the registrar is made aware that this device is unreachable, it will remove registrations for that device after determining if the information provided is sufficient to be certain the device is unreachable. For example, a registration for a telephone that is no longer reachable is removed and delivery of incoming calls will not be attempted for that device. Similarly, other types of failures may be detected, and appropriate actions taken for other services, as described below.

VPN Failure

In some embodiments, Provider Hub 211 makes a VPN connection to Service Provider 220 via VPN 710. The provider hub incorporates a VPN Client 720 module, and Service Provider 220 incorporates a VPN Server 721 module. While the connection here is shown between the provider hub and the service provider, the VPN connection could also originate from and be managed by other customer-controlled devices, such as Customer Devices 201, Customer Router 210, Access Device(s) 231, etc.

Because the VPN may direct packets from a number of different applications (e.g., packets to manage the VPN itself, applications for the Service Provider 220, other traffic from Customer Devices 201 that requires service provider intervention, etc.) between the service provider and the Provider Hub 211, there are a number of ways in which loss of the connection may be detected.

In some embodiments, the VPN Server 721 directly detects a failure or abnormality in the network connection to a particular VPN Client(s) 720, and sets and/or clears one or more variable(s) in response.

In various embodiments, the VPN Server 721 explicitly terminates the connection for any of several reasons (e.g., security, authentication, network overload, traffic shaping, or other). For example, if a customer or employee's service is terminated, the VPN server may disconnect any open connections. Similarly, an "abusive" connection—for example one sending excessive traffic, flooding the network with packets, or otherwise disrupting the operation of the network—may be intentionally closed. Since the connection has been terminated, the VPN server explicitly knows that the connection to the VPN Client 720 associated with that VPN connection has been lost, and sets and/or clears one or more variable(s) in response to the connection being terminated.

VPNs may be configured to explicitly send "keep-alive" packets between the remote device and the VPN server. These packets are sent explicitly (by the VPN server, remote VPN client, or both) to verify that the connection is still active and information is flowing properly between the two devices. Note that this traffic may or may not be VPN traffic. That is, it may be carried over the tunnel established between the VPN server and the remote device, but may flow over the open Internet between the two devices. The frequency that VPN keep-alive packets are sent is configurable in most implementations, but sending the packets every 10 to 30 seconds is typical. After a pre-configured number of keep-alive packets are not seen (for example, 3-5 missed packets), the connection is deemed to have failed or be in a degraded state, and the VPN can be terminated.

According to some embodiments, VPN Server 721 determines that a connection has failed or become degraded if expected VPN keep-alive packets are not seen. Keep-alive packets may be sent by each side periodically, and not seeing some predetermined number (e.g., 3) in a row indicates a failure, and the VPN server sets and/or clears one or more variable(s) in response to the failure detected.

According to various embodiments, each side periodically uses keep-alive messages to determine if the connection is still valid, but rather than simply watching for periodic keep-alive messages from the remote side, keep-alive requests are sent, and responses to keep-alive requests are expected. That is, a poll based approach is used. Failure to receive some number of responses (e.g., 3) to keep-alive requests indicates the other side is no longer connected. When VPN Server 721 fails to see the expected responses, it sets and/or clears one or more variable(s) in response to the failure detected.

Note that special purpose packets are not always needed for the VPN keep-alive messages. For example, IETF ICMP (ICMP) ping messages may be used to achieve the same result, as could any other message sent at regular intervals (including periodic application traffic), so long as the lack of such regular messages is interpreted by the VPN server to indicate loss of connection to the remote party.

In addition to or in place of using an explicit VPN keep-alive mechanism, some VPN servers may monitor the tunnel and determine a connection has failed if traffic of any type is not seen on the connection in a particular interval. That is, if the connection is unexpectedly devoid of traffic for a particular interval, this is interpreted to indicate a failure or degradation.

This interval may be a fixed (or configured) time period, for example 5 minutes, in which no traffic has been seen over the tunnel, or it may be determined that it is statistically unlikely that a connection would have had no traffic in this time period. That is, the system may statistically determine this network link has only a 0.1% chance of not seeing traffic for this duration, and thus determine the link is down. In other words, if a statistical model of the connection shows that the probability of the connection still being open after not seeing traffic on the connection for a certain time falls below a pre-determined threshold, the connection is deemed invalid.

In some embodiments, the remote device is connected over a VPN 710 via VPN Client 720, and VPN Server 721 monitors the connection to see if any traffic has been sent and/or received. If no traffic is seen in a particular fixed or configured interval (e.g., 5 minutes), this fact causes the VPN server to determine that the connection has failed. In response to the detected failure, the VPN server sets and/or clears one or more variables.

In various embodiments, the remote device is connected over a VPN, and VPN Server 721 monitors the connection to see if any traffic has been sent and/or received. If no traffic is seen for a given duration, a calculation is performed to determine the statistical likelihood that a valid connection would have no traffic for this duration. If the probability that a valid connection would have no traffic falls below a given pre-set threshold, this fact causes the VPN server to determine that the connection has failed, and it sets and/or clears one or more variables in response to the failure detected.

According to some embodiments, an additional step is taken. If the VPN Server 721 determines it is statistically likely the network has failed or become degraded, one or more active checks (e.g., sending ICMP ping requests to the client, sending a VPN keep alive request, or other similar mechanism) are performed to attempt to determine if the connection is still valid before setting and/or clearing the variable(s) in response to the failure detected.

Figure 8:
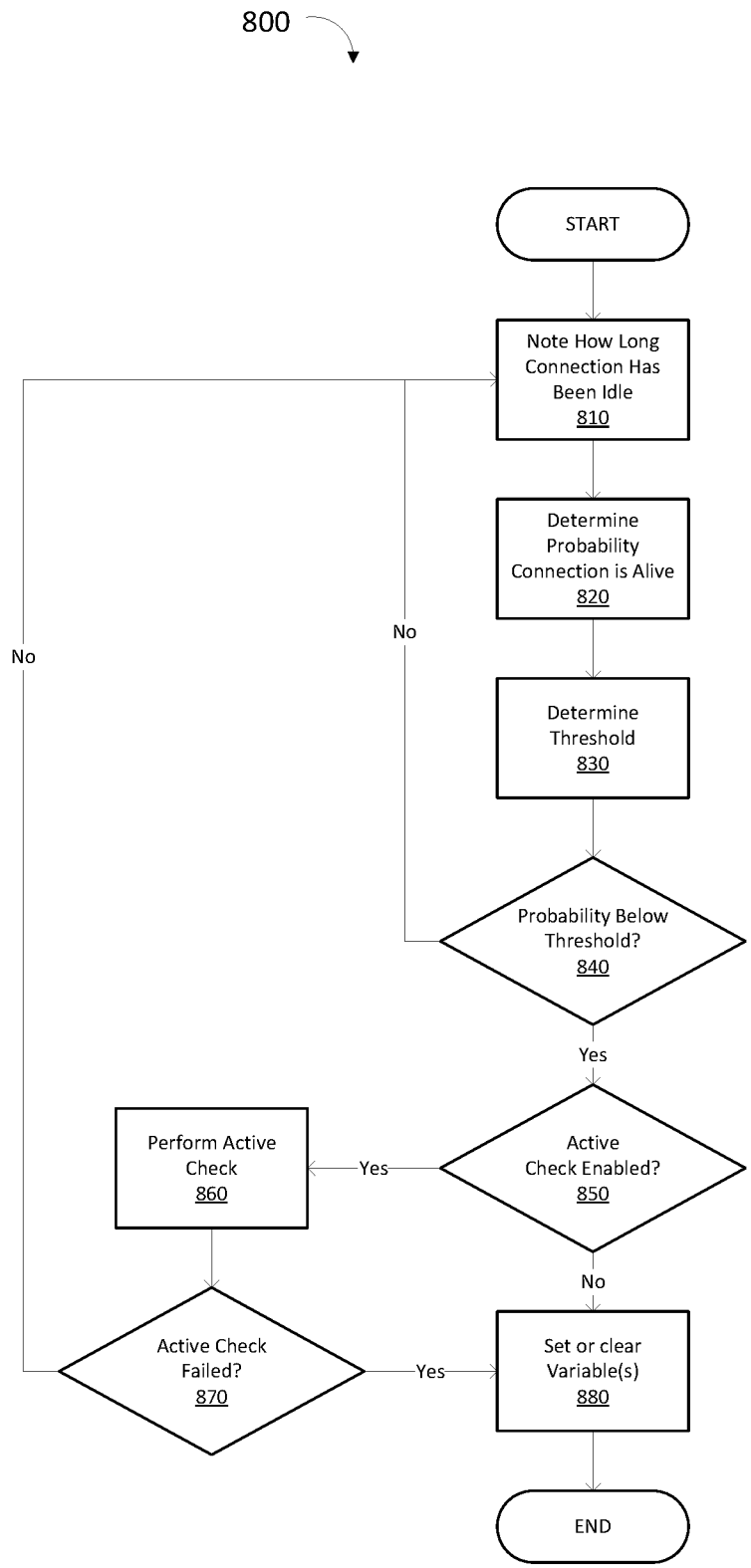
FIG. 8 is simplified flow diagram of a method for evaluation, in accordance with various embodiments.

FIG. 8 is a flow diagram of a method 800 for statistical determination with optional active check. This process can be performed at steps 510, 520, and 525 (FIG. 5).

At step 810, the system can determine how long the connection has been idle. At step 820, a statistical model can be used to predict the probability that the connection is still alive if no traffic has been seen in the time determined at step 810. For example, if it was determined that the connection had seen no traffic in 3 minutes at step 810, at step 820 the statistic model determines a probability P that a live connection would have no traffic in 3 minutes. Note that a variety of models may be employed, including ones based on general behavior of all connections the VPN server has seen; behavior from all connections the manufacturer has seen; behavior as predicted in the literature; or other models. Additionally, models may take into account the behavior of this particular user or connection, learning that particular users are more or less "chatty," and correspondingly, that those connections may have higher or lower probability of being silent for a given interval while still connected.

At step 830, a probability threshold T at which a connection is processed as potentially closed can be retrieved. Probability threshold T is the probability at which it is deemed too unlikely a live connection would have had no traffic for the interval of time seen. For example, the system may be configured such that if the probability P (determined at 820) that the connection could be alive and have been idle for the time interval observed (determined at step 810) is less than T=1%, processing for a potentially dead connection is performed. This value may be configured by an operator, configured by the end user, obtained experimentally, or otherwise calculated by the system.

At step 840, probability P (from step 820) can be compared to probability threshold T (from step 830). If probability P is above probability threshold T (e.g., P>T), this implies that the probability of a valid connection being idle exceeds the threshold. If P>T, method 800 proceeds to step 810 (e.g., to continue monitoring the system).

If probability P is below probability threshold T (e.g., P<T), this implies that the probability of a valid connection being idle can be less than the probability threshold. In such a case, the connection should be potentially considered dead and processing continues at step 850. At step 850 it is determined if the system is configured to perform an active check to confirm if the connection is alive. If the active check is requested, control proceeds to step 860 to perform the active check. If the active check is not requested, control will continue at step 880.

At step 860, the active test can be performed, for example, by sending an ICMP ping message, VPN keep-alive message, or similar query to actively determine if the connection is live, but just happened to have no traffic for an extended period. After an appropriate time to determine the results of the active test, control passes to step 870, where it is determined if the check has failed. If the check has not failed, the connection is deemed to be alive (and the time that the connection has been idle is reset to zero), and control passes back to step 810 to monitor the connection to see if it is idle.

If the active check fails at step 870, or no active check was requested at step 850, control moves to step 880, where it is assumed the connection is dead, because the idle time without traffic was deemed too long. At step 880 (e.g., an instance of steps 520 and 525) the system sets and/or clears one or more variable(s) in response to failure detected.

In some embodiments, a variable can be set containing the connection idle time periodically, rather than interpretation being applied while collecting information. This allows pre-defined actions taken (e.g., as described in FIG. 6) to determine thresholds at the time actions are taken, rather than relying on the threshold being determined at the time the variable is set.

While the VPN Server 721 is described as detecting that traffic is not seen flowing over the network, this procedure could also be performed by another device or module within Service Provider 220 which has visibility into network traffic and can determine if no traffic has been seen from the remote side. For example, a core router within the service provider would also be able to monitor the connection for the time it has been idle and take appropriate actions. Any traffic packets flowing over the VPN's connection (e.g., relayed by the VPN server) may trigger these action, explicit testing traffic is not required. VPN servers may also use TCP connection timeout indications to detect failure of the network connection.

In some embodiments, the remote device (e.g., Provider Hub 211 via VPN Client 720) is connected to Service Provider 220 over a VPN 710, and the VPN tunnel is established over a TCP connection. In this case, acknowledgements are generated by the receiver for all packets sent over the TCP connection as part of the reliability implemented by TCP. When TCP is used, if packets are lost, those packets are retransmitted either when the sender fails to see the expected acknowledgement after a given time (timeout) or when acknowledgements of subsequent packets indicate using sequence numbers that one or more intermediate packets have not been received. When just a few packets are lost, these mechanisms can be used to retransmit those (few) missing packets. However, if no acknowledgments are received after multiple retries, the TCP stack, running the TCP algorithm, determines the connection itself is dead or not adequate to carry the connection-oriented link, and the application is signaled that the connection is no longer available.

In various embodiments, VPN Server 721 receives a signal from the TCP stack and recognizes the remote device is no longer reachable. When this failure is detected, this fact causes the VPN server to determine that the connection has failed, and it sets and/or clears one or more variables in response to the failure detected. Any traffic packets flowing over the VPN's connection (e.g., relayed by the VPN server) may trigger these action, explicit testing traffic is not required.

According to some embodiments, other network failures not expressly described here are detected by the VPN Server 721, and a network fail variable is set. These include, but are not limited to detecting explicit termination messages from the VPN Client 720, detecting a failure of the underlying hardware link, etc. Again, in this case the VPN server sets and/or clears one or more variables in response to the failure detected. Other mechanisms for the detection of network failures can be used.

Link Layer

In some embodiments, detection of link layer failures may be used to detect remote device connection failures. Link layer traffic (e.g., ARP (Address Resolution Protocol) traffic) between a network at Service Provider 220 and a remote device (e.g., Provider Hub 211, Customer Device(s) 201, and/or Customer Router 210) is proxied over a VPN 710 to make the remote device appear to be local to not only at the network layer, but the link layer. In this case, the link layer traffic (e.g., ARP) is also forwarded across the VPN between the remote device entity and the central network entities proxying this link layer traffic.

In various embodiments, an ARP relay is used to extend link-level traffic across the VPN. Devices monitoring link layer traffic (e.g., hosts, routers, switches, etc.) maintain ARP tables mapping IP address to Ethernet (MAC) address. Periodically, devices send ARP request to verify that devices are still associated with a particular IP address. As ARP table entries for the remote device expire on various devices in the Service Provider 220 network, these device will send ARP requests asking the remote device to verify it is still associated with the remote device IP, in order to update/refresh the ARP table. The ARP relay will forward this information over the VPN.

An ARP Entity 724 at Service Provider 220 can participate as a link layer device. The link layer device may be the ARP relay or other link layer devices (e.g., hosts, switches, routers, etc.). If an ARP Entity link layer device in Service Provider 220 finds that an ARP table entry has expired for a particular IP address of a remote device, and the remote device does not respond to the renewal request, the link layer device then determines that the connection for that IP address appears to no longer be available. The ARP Entity then sets and/or clears one or more link-level failure variables in response to the failure detected.

Analogously, if the remote device uses ARP over the ARP relay to find the MAC address of a device in Service Provider 220, and this fails, this may indicate loss of the network connection. Further tests (e.g., more ARP requests) can be used to determine if the failure is a network failure or simply that the one entity the ARP request was sent to has failed. In either case (e.g., single entity or generalized network failure), the remote device then sets and/or clears one or more link-level failure variables in response to the failure detected.

Registration Timeout

As described above, many protocols, including those used to enable communications devices, involve registering users to their devices. Registration messages indicate that a particular user may be reached at a particular device. Typically, these registrations have a finite life time. That is, each registration has an expiration time, and can be refreshed periodically to maintain the registration. Contact with a particular user is established to registered device(s) when communications session requests for that particular user are received.

In some embodiments, SIP is used as the protocol between a remote customer device (e.g., Provider Hub 211, Customer Device(s) 201, Customer Router 210, etc.) and a Registration Server 722 at Service Provider 220. Registration messages are periodically received by the registration server. In the event that a registration message is not received by Registration Server 722 before the expiry time of the registration, the registration server sets and/or clears one or more variables in response to the failure detected.

In various embodiments, rather than using SIP, registrations are maintained in a DNS server database. That is, Registration Server 722 can be an instance of a DNS server used by Service Provider 220. When the end user VPN connection over VPN 710 is refreshed, a mapping between the user's ID and the VPN IP address (e.g., the address the end device is reachable over via the VPN) is used to create a DNS entry mapping a user name to an IP. For example, a user abc1234 registering IP address 10.1.1.1 may result in a DNS entry of abc1234.domain.com mapping to 10.1.1.1. This is used internally to route communications to the end user device when incoming communications requests (calls) reach Service Provider 220. Failure to refresh the VPN connection result in failures being detect as mentioned above, but may also cause the registration within the DNS server (e.g., the instance of the registration server) to expire. Accordingly, the registration server (e.g., DNS server) sets and/or clears one or more variables in response to the failure detected.

According to some embodiments, a protocol, or mechanism other that SIP, or the DNS/VPN approach described above is used to handle registration. Failure of the end user device to register periodically, allowing a registration to expire, causes the registration server to set and/or clears one or more variables in response to the failure detected.

Failure of Expected Interaction

In some embodiments, a remote customer device (e.g., Provider Hub 211, Customer Device(s) 201, Customer Router 210, etc.) is interacting in some way with Interaction Entity(s) 723 at Service Provider 220, either over VPN 710 or directly over Non-VPN Connection 740. Numerous other interactions may be occurring between the customer device and the periodic entity that produce or require interactive traffic to be exchanged. Failures of this exchange may indicate a failure or degradation. Interaction Entity(s) 723 can be such an entity. It is a part (e.g., process, device, module, etc.) of Service Provider 220's architecture that expects interaction with one or more customer entities.

In various embodiments, Interaction Entity(s) 723 expects regular communication from a remote (customer) device. These communications could be updates sent from the remote device at regular intervals to provide information to the interaction entity, or replies from the remote device to periodic queries from the interaction entity. Similarly, the remote device may expect messages or query responses from the interaction entity. The absence of these communications between the participants is interpreted as a failure of the connection between the interaction entity and the remote device. In the absence of expected interaction traffic, the participants can detect the network failure and set and/or clear one or more variables.

According to some embodiments, this information may not be reported at regular intervals, but rather as circumstances dictate. For example, information may be sent only when the status of the device changes. Despite information not flowing at regular intervals, statistical models are used to predict the probability that no interaction would be seen within a given time for a live connection. When the probability falls below a pre-defined criteria, this will be interpreted to indicate a network failure or degradation, and one or more variables will be set and/or cleared.

According to various embodiments, Interaction Entity 723 is a management and/or monitoring server(s). Regular communication is expected between a remote (customer) device and the monitoring and/or management server(s). This communication could be updates sent from the remote device to provide information to the server, replies from the remote device to periodic queries from the server, updates sent from the server to the remote device, or responses from the server to queries from the device. The absence of these communications between the participants, either at specific intervals, or at non-specific intervals using a probabilistic model, is interpreted by the management server as a failure of the connection to the remote device. In the absence of expected interaction traffic, the participants can detect the network failure and set and/or clear one or more variable(s).

In some embodiments, the messages or responses exchanged between the remote device and Interaction Entity(s) 723 contain status information relating to or measured by the device and/or interaction entity. For example, this could include CPU or processor load, capabilities, resource usage, or other parameters of interest for management.

In various embodiments, the Interaction Entity(s) 723 and/or the devices may also periodically measure the latency, bandwidth, or other properties of the network connection between the interaction entity and the remote device by sending probe traffic, and then report this information to the server, the remote device, or other remote devices, as appropriate. Other remote monitoring, administrative, or diagnostic messages may also be sent, including SMTP messages, remote logging systems, etc. Both the probe traffic itself as well as the exchange of resulting measurements may constitute expected interactive traffic.

According to some embodiments, Interaction Entity(s) 723 is a security server. Authentication, authorization, credentialing, or other services related to security and access control can be performed between the remote device and the security server(s). Periodically, the remote device provides appropriate credentials, or respond to requests for their credentials, for example, to re-authenticate. In another instance, this information may not be required at regular intervals, but statistical models may be used to detect when traffic should have been seen with high probability, and interpret the lack of traffic as a failure. If this exchange fails at any time, the security server(s) sets and/or clears one or more variable(s) in response to the failure detected.

According to various embodiments, Interaction Entity(s) 723 is an accounting or billing server. Accounting information can be tracked by the remote device, and either reported (e.g., periodically or at the time of a transaction) to one or more accounting server(s), or the server periodically queries the remote device for accounting information. In another instance, this information may not be required at regular intervals, but statistical models may be used to detect when traffic should have been seen with high probability, and interpret the lack of traffic as a failure. Failure of the remote device to respond or to provide this accounting information when expected causes the accounting server to set and/or clear accounting failed variable(s) in response to the failure detected.

Presence-based or subscription based solutions can use subscriptions and/or polling to update the status or "presence" of information of interest across a network. For example, a device may subscribe to the status (e.g., availability to chat) of a number of other users for an interactive chat system, or to information about physical devices (e.g., open or closed state door) for an alarm system. As users become available, go idle, log off, or other changes, this information is conveyed to all interested (subscribed) consumers. A status server or servers maintains this information, learning from remote devices when it changes, and relaying these changes to other devices.

Similar mechanisms can be used to subscribe to voicemail boxes, for example, to see if any voicemail is waiting to be listened to. Polling of voicemail occurs at regular intervals, with the Asterisk SIP server (e.g., a communications system) using a default of 30 seconds for the polling interval.

Subscription-based information is not limited to communications. Systems may send relevant information to interested parties at regular intervals. Cameras (e.g., "webcams" of sites of interest) may provide a "snapshot" to all interested users every few minutes. These may send updates when the value changes, periodically, or some combination thereof. These interactions can require communication between the remote device and one or more devices on the central network.

In some embodiments, Interaction Entity(s) 723 is a presence or subscription server. Updates of status information, for example, subscriptions, presence information, subscribe/notify, can be exchanged between a remote device and one or more status servers. Any change to the tracked status information is reported either by the remote device (to the status server) or by the status server (to the remote device). Additionally, in some cases, the status values are reported periodically (e.g., every 30 seconds, 10 minutes, etc.) even if they do not change. Examples of information that may generate user status include but are not limited to user presence; user idle time; availability of voice, text, e-mail, or other media messages; activity of user (e.g., music being played, show watched, etc.); temperature or weather information; number of users participating in or viewing a session; etc. In another instance, this information may not be reported at regular intervals, but statistical models may be used to detect when traffic should have been seen with high probability, and interpret the lack of traffic as a failure. Failure of either the remote device or server to respond or to provide this status information when expected causes the status server and/or remote device to set and/or clear one or more variable(s) in response to the failure detected.

In various embodiments, Interaction Entity(s) 723 is an information server. The nature of the information produced or consumed by the server can require updates of other information be reported at regular intervals from the remote device to the server, or from the server to a remote device. For example, data of interest may be sent at regular intervals. Examples include sensors taking readings (e.g., temperature, pressure, sound, humidity, etc.); cameras sending still or video images; microphones sending audio information; consumer electronic devices reporting on their usage, state, or other information (e.g., a cable box reporting channels watched, a music application reporting files played, a video game reporting hours of engagement, etc.); etc. In another instance, this information may not be reported at regular intervals, but statistical models may be used to detect when traffic should have been seen with high probability, and interpret the lack of traffic as a failure. Failure of the remote device and/or server to respond to or to provide this information when expected causes the server and/or remote device to set and/or clear one or more variable(s) in response to the failure detected.

Other application-level interactions between applications located on the central network and the remote device can also generate traffic across the network. The following examples are of such application-level interactions. These interactions use communication between the remote device and one or more devices on the central network.

According to some embodiments, Interaction Entity(s) 723 is a communications server, for example a gateway, proxy server, telephony server, soft switch, IP-PBX, etc., communicating with a remote device (e.g., a telephone, communications function in Provider Hub 211, etc.). While messages needed to establish, maintain, or prepare for communications are exchanged, the device or server fails to send, receive or receive a response from the server or device as expected. In response, the server and/or remote device to set and/or clear one or more variable(s) in response to the failure detected.

According to various embodiments, Interaction Entity(s) 723 is an application server, interacting with an application on a remote customer device. Applications by their nature are expected to generate traffic between the remote device and server at regular intervals. Examples of this type of traffic include database queries; web requests; sending of outgoing email; polling for incoming email; interaction between home automation devices and servers; updates from security device applications including sensors and cameras; social media update; communications to or from digital assistants; connections to stream media; synchronization of data, for example notebooks, shared drives/folders, etc. taking readings (temperature, pressure, sound, humidity, etc.); cameras sending still or video images; microphones sending audio information; consumer electronic devices reporting on their usage, state, or other information (e.g., a cable box reporting channels watched, a music application reporting files played, a video game reporting hours of engagement, etc.); etc. In another instance, this information may not be reported at regular intervals, but statistical models may be used to detect when traffic should have been seen with high probability, and interpret the lack of traffic as a failure. Failure of the remote device and/or server to respond to or to provide this information when expected causes the server and/or remote device to set and/or clear one or more variable(s) in response to the failure detected.

Checking DNS

Customer remote devices, for example Provider Hub 211, Customer Router 210, and Customer Devices 201 may track if DNS queries are being resolved properly. If the DNS server is unreachable, unresponsive, or not returning valid results, the device will set and/or clear one or more variable(s) in response to the failure detected, noting that DNS is not functioning properly.

In some embodiments, the device sets and/or clears the DNS-related variables any time that a DNS query is performed. That is, the variables are set and/or cleared any time DNS is needed during ordinary activity of the device. In another example, the device periodically performs a DNS query explicitly to determine if DNS service is functional. By way of further example, the device performs DNS queries explicitly (only) when ordinary activity has not required a DNS search for a pre-defined period of activity in order to verify DNS is functional. In at least some of the above examples, in response to the success or failure of the DNS query, the device will set and/or clear one or more variable(s).

In various embodiments, a specific DNS server is used. For example, the specific DNS server is hosted and located at Service Provider 220. In such a case, the variables set may indicate a generalized failure, but may also be indicative of potential connectivity issues to the Service Provider. By way of further example, an external service is used to provide DNS, and connectivity to it may indicate generalized network failures or connectivity issues to the DNS service provider. By way of additional example, DNS requests are sent to the Service Provider, where they are relayed to a DNS service provider. In this instance, failure to resolve a hostname using DNS may indicate generalized connectivity issues, connectivity issues to the Service Provider, or connectivity issues between the Service Provider and the DNS service provider. In at least some of the above examples, in response to the success or failure of the DNS query, the device will set and/or clear one or more variable(s).

Check Third-Party Locations

Customer remote devices, for example Provider Hub 211, Customer Router 210, and Customer Devices DD001, may have one or more variables indicating failures of the connection to the Service Provider 220. However, alone, these variables may only indicate that the connection to the service provider does not function. Alone, a variable indicating failure to reach the service provided may not confirm the network itself has failed. Accordingly, these devices may also monitor the connection to one or more third-party internet location(s) to determine if these sites are reachable.

Different ways for determining reachability can be used. ICMP protocol messages (e.g., ping) may be used to determine basic network connectivity, or more specialized transactions (e.g., fetching a web page, attempting to stream a video, etc.) may be employed. The variable(s) set and/or cleared in response to the test may indicate which type of test was performed.

The definition of third-party in this context may vary. In one case, a pre-configured list of third-party entities (e.g., major Internet sites) is used. In another case, any Internet address that is not associated with Service Provider 220 or with the Customer Network(s) 202 is considered a third-party. Determination if an address is part of the customer network may be made, for example, by using the network netmask. Similarly, addresses associated with the Access Network(s) 230 may be filtered and excluded in the case where the device has access to the netmask of the access network. The variable(s) set and/or cleared may indicate information about the specific third-party contacted or other information about the third-party reached.

In some embodiments, the device sets and/or clears the third-party-related variables any time that a third party is contacted. That is, the variables are set and/or cleared any time a third-party is contacted during ordinary activity of the device.

In various embodiments, the device periodically (explicitly) contacts a third-party location to determine if that third-party is reachable. Alternatively or additionally, the device performs an explicit test when ordinary activity has not required a connection to a third-party for a pre-defined period of activity to determine third-party reachability. In at least some of the above examples, in response to the success or failure of the connection to the third-party, the device will set and/or clear one or more variables.

Detection Via Network Protocols and Probing

Various network protocols can support direct notification of failures (e.g., SNMP), may be used to measure if connectivity is available between locations, and the like. SNMP provides direct reports from devices about failures of connections, which may be used to set and/or clear one or more variable(s).

For example, direct measurements may be taken of connectivity using ICMP protocol capabilities such as ping and traceroute. Interactive Connectivity Establishment (ICE) may also be used to attempt to open a connection between two devices (e.g., Provider Hub 211 and a destination). The results of ICE and/or ICMP tests can indicate connectivity and/or quality of connectivity.

By way of example, the IETF's Failure Detection and Locator Pair Exploration Protocol for IPv6 Multihoming (the REAP protocol) provides additional mechanisms to test for connectivity. This protocol and similar protocols may be used to set and/or clear one or more variable(s) indicating network failure or degradation.

Detection of Network Wide Conditions

In addition to detecting failures relating to connections to/from a single remote customer device, and setting variable(s) in response, failures of multiple remote customer devices may be detected. In some embodiments, if a link is severed to a particular neighborhood, failures may be detected for all the remote customer devices in that neighborhood.

For example, detection of simultaneous or near-simultaneous failures of a number of remote customer devices causes the detecting entity (e.g., a device in Service Provider 220, the customer ISP, or an intermediary device) to set variable(s). In this case, the variables may not indicate a failure, but that these devices are correlated in their failure states. Algorithms to determine the threshold at which forming a grouping is considered appropriate can be applied to remove coincidence. By way of further example, it may be required that two or more correlated failures be detected to confirm that a group of end customer devices form a group. Variable(s) may be set/cleared to help identify and create groups of end customer devices.

Detection of groups may allow the Service Provider to identify groups of end customer devices associated with particular ISP or intermediary network infrastructure. For example, it may allow determination of which locations for regional networks, to identify which devices are supported by which regional data center, to identify which (potentially geographically or topologically distributed) devices are associated with which distributed load-balancing server, etc. This information can then be stored in variable(s) to improve the performance of the system, as well as to provide unique data for use by Service Provider 220.

Groupings of end customer devices may also be configured explicitly. If it is known at the time that the system is configured, variables may be set indicating groups of end customer devices belong to a group. For example, based on IP address, it can be determined that a group of end customer devices share a particular ISP, and variable(s) may be set and/or cleared to indicate this.

Variables may be set to indicate multiple groups to which an end customer device belongs. In this way, groups may indicate a particular ISP, particular ISP region, particular geographic region (independent of ISP), etc.

Such information grouping end customer devices may also be stored via other mechanisms, for example, in databases, flat files, etc., and variable(s) are only set and or cleared when failures are encountered, indicating that other end customer devices may also have experienced (or is on longer experiencing) a degradation or failure, because it is in a common group with other end customer devices which have experienced (or is no longer experiencing) a similar failure or degradation.

Actions to Respond to Failures

Once variables are set indicating failures or degradation to the network, various pre-defined actions can be taken, as illustrated by FIG. 6.

As with the process to set/clear variable(s), pre-defined actions may be taken by customer entities, e.g., Customer Devices 201, Customer Router 210, Provider Hub 211, Access Device(s) 231, or other customer devices; by access network or Internet entities; by entities within Service Provider 220; etc.

Service Provider Side

Actions may be taken by Service Provider 220 in response to network failure or degradation (or resolution thereof). Actions taken may be performed by the detecting module or device, or the detecting module or device may notify a different module or device within the service provider. For example, VPN Server 721 may detect that a network failure has occurred, but the resultant action may be taken by Registration Server 722.

Actions may be taken on groups of end customer devices, as well. If a pre-determined number (or percentage, fraction, etc.) of end customer devices within a group have set or cleared variable(s) indicating failure or degradation of the network (or the resolution thereof), actions may be taken for all the end customer devices within that group preemptively. For example, actions are taken for all members of a group, even those that have not detected and set/cleared variable(s) to indicate failure or degradation (or resolution thereof), if a pre-set number, percentage, or fraction have set/cleared variable(s).

By way of further example, variables for the remaining members are set/cleared (rather than action taken directly) in response to a pre-determined number, fraction, or percentage of the group indicating failure. By way of additional example, the remaining members (those that have not set/cleared the variables, if reachable) are directed to test further for the failure condition prior to setting/clearing variables or taking action.

De-Register Communications Device

In some embodiments, the setting of network failure variables is used by the Registration Server 722 to remove a registration for a non-viable communications device, prior to the registration from the device expiring. If the registration server determines that one or more of these variable(s) indicates to the registration server that the connection to the IP address(es) associated with that remote device have been lost, and takes a pre-defined action to remove the registration. Alternatively or additionally, a different entity in Service Provider 220 detects the variable change and takes a pre-defined action to remove the registration. Alternatively or additionally, the VPN server 721 notices the variable change itself and takes a pre-defined action to remove the registration. Alternatively or additionally, a different communications server or device (e.g., a gateway, proxy server, telephony server, soft switch, IP-PBX, etc.) observes that variables have been set indicating failure, and takes a pre-defined action to remove the registration.

The pre-defined action to remove the registration may vary, depending on implementation. For example, the action is to send a message to the registration server, asking it to remove the registration. By way of further example, a message, command, instruction or direct interaction is used to remove the registration from the database or other data store (e.g., DNS server, flat file) used to store registrations.

The pre-defined action may include other steps beyond removing the registration. For example, the Registration Server 722 sends a message to the remote device indicating it has been de-registered. This forces the device to re-register if it is available. In another embodiment, this message is sent by another entity in Service Provider 220 on behalf of the registration server.

By way of further example, the device is one of Provider Hub Customer Devices 250 as shown in FIG. 4. In such a case, a message indicating the device has been deregistered is sent over Secondary Access Network(s) 241, allowing the message to be received even if Access Network(s) 230 has failed, potentially allowing the device to re-register over the secondary network.

By way of additional example, the Registration Server 722 sends a message to user of the remote device indicating it has been de-registered. This allows the user to investigate the cause of the problem and potentially correct the issue. Additionally or alternatively, this message is sent by another entity in Service Provider 220 on behalf of the registration server. The message may be sent in many forms, including a phone call or text message to a telephone number (different than the one with the failed registration); email; push notification in mobile application (potentially over a secondary network such as 4G); as a message over another secondary network; or other mechanism specified by the user or service provider.

While a variable set by VPN Server 721 indicating a connection has been terminated can be a clear indication a remote device is unreachable, in other cases multiple variables may be consulted prior to removing a registration. Unlike a direct report that the VPN has terminated from the VPN server, other causes besides network failure may be at play in such scenarios and a network link may still be accessible. For example, a network monitoring server or accounting server losing connection with a remote device may indicate network failure, but may also indicate that the remote device's monitoring software has crashed or the accounting server has encountered an error. Similarly, for ARP relay, the failure likely indicates the device connection is down, but could also indicate the relay has failed. These other factors can be considered in determining if the registration should be removed.

Such determinations based on other network traffic (e.g., other than by the VPN Server 721) variables may be made regardless of whether the connection to the remote device takes place over VPN 710 or over a direct, network connection such as Non-VPN Connection 740.

Figure 9:
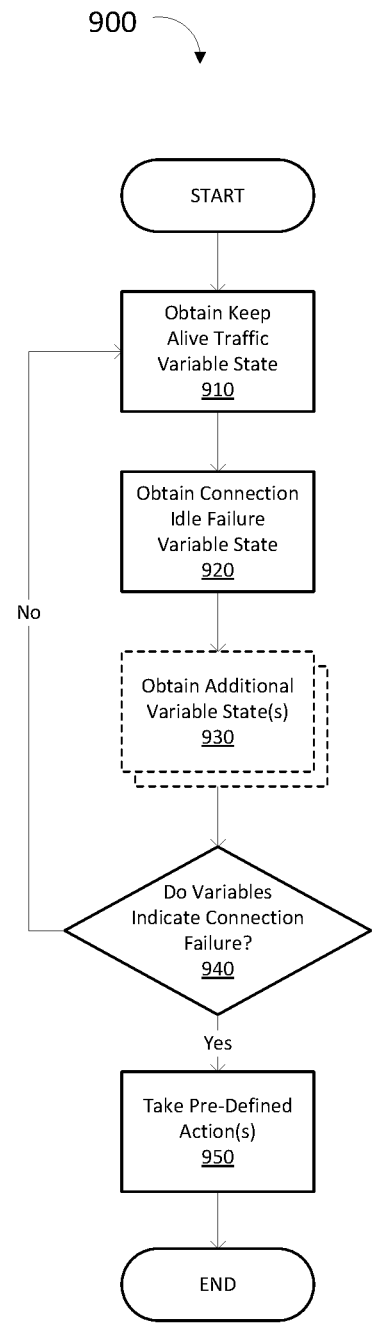
FIG. 9 is simplified flow diagram of a method for processing multiple events, according to some embodiments.

FIG. 9 illustrates a flow diagram of an example method 900 for processing multiple events to determine if a predefined action of removing a device registration is appropriate. The device can be connected over VPN 710, and VPN Server 721 may not have set flags indicating that the connection has been explicitly broken. This is a particular instance of the flow illustrated by FIG. 6. This process may be run by Registration Server 722 or another entity at Service Provider 220.

In method 900, the variables tracking the status of VPN keep-alive traffic and connection traffic (i.e., has the connection been idle too long?) and optionally other variables can be used.

At step 910, the system can obtain the variable(s) tracking the state of the keep-alive packet traffic monitoring. Note that this can be monitored separately (and variable(s) set and/or cleared) in an action not shown in FIG. 5, and at this step the system is checking if the variables are set indicating keep-alive packets are being received/responded to as expected.

At step 920, the system can determine if variables reflecting time since the last traffic flowing through the tunnel is currently indicating a valid connection. As before, this is checking the current status, and the setting and/or clearing is handled elsewhere. In this case, the process of detecting this property and setting the connection idle fail variable to true is detailed above in relation to FIG. 8.

At optional step 930, additional variables can be obtained and checked to see if they indicate the connection is broken. These variables correspond to any other connection status information devices within Service Provider 220 may obtain (e.g., link failure information, information from Interaction Entity(s) 723, etc.).

At step 940, it can be determined if any of the connection state variables indicate a connection failure has occurred. If not, method 900 returns to step 910 and monitoring of the variables continues.

Step 940 may consist of checking a Boolean value of a variable (e.g., is a variable indicating a failure set), and/or raw variables (e.g., set at step 505) may be used to make more sophisticated determinations. For example, the connection idle variable may indicate failure, but raw values may be consulted by the entity executing method 900 to decide if the determination criteria used to set the failure variable is acceptable. By way of further example, the failure variable set in Process 800 may not be used, and the raw variable(s) set in step 505 may be used instead. By way of additional example, the variable(s) may indicate insufficient information, and additional measurements (e.g., active probes) may be used to supplement the variable(s) collected.

If at step 940 a variable (is determined to) indicate failure/degradation, method 900 proceeds to step 950, where the pre-defined action(s) discussed above are taken in response to determining that relevant variables have been set.

An expiry mechanism built into communications registration protocols can help to handle failure or unclean exit scenarios, but may not be perfectly predictive. Because the expiry times are frequently quite long, there is opportunity for failure. If the end user device registers and failure or unclean exit occurs prior to the expiry time, then the servers will be unaware the device is available. In such cases, the server may erroneously believe the end user device is still capable of accepting calls and behave improperly. For example, while the servers may be configured to redirect incoming calls to voice mail if no device is available to service the user's call, if the servers believe the device is still available, then this behavior may fail or be delayed while the server attempts to reach a non-reachable device. Some embodiments, by monitoring other variable(s), can advantageously more rapidly detect failed or unreachable devices, resulting in a more reliable communications system.

Notify Customer

In some embodiments, when one or more monitored variable(s) indicates a network failure or degradation (e.g., independent of communications devices and/or registrations for communications devices), the detecting entity sends a message to user that the connection has been lost. This allows the user to investigate the cause of the problem and potentially correct the issue. The message may be sent in many forms, including a phone call or text message to a telephone number (e.g., different than the one with the failed registration); email; push notification in mobile application; out-of-band (e.g., second network) notification; or other mechanism specified by the user or service provider.

Notify Command/Monitoring Center

In some embodiments, the service associated Service Provider 220 is a critical service, for example security monitoring, health monitoring, or a similar service that cannot be interrupted. When one or more monitored variable(s) indicates a network failure or degradation, and the service is critical, a command or monitoring center can be notified. The detecting entity sends a message to the command or monitoring center that the connection has been lost. This allows the command or monitoring center to take other actions, including notification of the customer, and/or sending an appropriate response. For example, the service is an alarm monitoring service. When the loss of connection is detected, the service attempts to contact the user to determine if there is a threat, and if the user indicates there is or cannot be reached, police or security are dispatched to investigate.

Notify Remote Device to Use Secondary Network

In some embodiments, one or more devices on the customer network (e.g., Customer Device(s) 201, Customer Router 210, and Provider Hub 211) are connected to more than one network. In FIG. 4, the illustrated provider hub is an example of such a configuration. In FIG. 4, the provider hub has access to Access Network(s) 230, in this case via Customer Router 210 and Access Device(s) 231. Additionally, Provider Hub 211 has access to Secondary Access Network(s) 241 via Secondary Access Device(s) 240. Other architectures are possible, including both networks being connected to the provider hub, networks where the customer router connects to the primary network via the provider hub but has a secondary network, networks where the customer router has both connections, and other architectures. Different devices featuring the secondary connection can be used.

Upon detecting a failure, an entity in Service Provider 220 contacts the customer device equipped with a secondary network over the secondary network. In some cases, the remote device may (initially) be unaware that the connection is not working properly, but is made aware via the secondary network connection. The remote device may then use the secondary network, both to contact Service Provider 220, as well as optionally for other services.

In various embodiments, the secondary network is combined with customer notification, as a mechanism to inform the customer that the primary network has failed.

Customer Side: Use Alternate DNS Service

In some embodiments, Provider Hub 211's own address is used as the address of the server to resolve DNS requests. This allows DNS requests to be proxied as desired by the Provider Hub. The Provider Hub may then direct requests to the Service Provider 220, to an alternate DNS service provider, to a well-known public DNS server (e.g., Google's 8.8.8.8 DNS service), or to an ISP or other service provider DNS server.

Alternatively or additionally, the addresses of a DNS server located at the Service Provider 220, of an alternate DNS service provider, of a well-known public DNS server (e.g., Google's 8.8.8.8 DNS service), or of an ISP or other service provider DNS server is used (instead of the Provider Hub 211's address).

Alternatively or additionally, the Provider Hub provides the DNS server address(es) to clients (e.g., Customer Devices 201 and/or Provider Customer Devices 250) directly using DHCP at the time the devices request a network address. Alternatively or additionally, Customer Router 210 provides the DNS server address(es) to clients. The Customer Router may itself obtain the DNS server address from the Provider Hub or may be pre-configured to provide one of the addresses discussed above. Alternatively or additionally, an external DHCP server provides the DNS server address to the clients.

In various embodiments, one or more devices are hard-coded or pre-configured to provide one of the addresses above.

For example, the network configuration is such that the DNS server used is located at Service Provider 220, or at a DNS service provider and relayed via the Service Provider. When variables indicate failure of reachability to the Service Provider, an alternate DNS server may be specified (e.g., directly to DNS service provider, an alternate DNS service provider, a well-known public DNS server (e.g., Google's 8.8.8.8 DNS service), or an ISP or other service provider DNS server may be specified.

By way of further example, a DNS server other than one located at Service Provider 220, or DNS service provider and relayed via the Service Provider is used. When variables indicate failure of reachability to the DNS server used, an alternate DNS server may be specified (e.g., directly to DNS service provider, an alternate DNS service provider, a well-known public DNS server (e.g., Google's 8.8.8.8 DNS service), or an ISP or other service provider DNS server specified.

Different ways of using the alternate DNS server can vary depending on the network architecture. For example, Provider Hub 211 performs the DNS resolution on behalf of clients (e.g., Customer Devices 201 and/or Provider Hub Customer Devices 250) which are given the Provider Hub's address as the DNS server via DHCP (from Provider Hub 211, Customer Router 210, or some other DHCP server). In this case, the Provider Hub uses the alternate address to perform DNS lookups on the client's behalf. By way of further example, clients are provided the DNS server address as part of the DHCP process. In that case, newly connected clients and those renewing their DHCP leases will obtain the new DNS server address. Note that short duration DHCP leases (e.g., 5 minutes) may be used as a mechanism to ensure that clients will be forced to renew their lease, more rapidly obtaining a new DNS server in the event of failure.

Customer Side: Use Alternate Network

In some embodiments, Provider Hub 211's own address is used as the address of the server to resolve DNS requests. This allows DNS requests to be proxied as desired by the Provider Hub. The Provider Hub may then direct requests to the Service Provider 220, to an alternate DNS service provider, to a well-known public DNS server (e.g., Google's 8.8.8.8 DNS service), or to an ISP or other service provider DNS server.

Alternatively or additionally, the addresses of a DNS server located at the Service Provider 220, of an alternate DNS service provider, of a well-known public DNS server (e.g., Google's 8.8.8.8 DNS service), or of an ISP or other service provider DNS server is used instead of the Provider Hub 211's address.

For example, the Provider Hub provides the DNS server address(es) to clients (e.g., Customer Devices 201 and/or Provider Customer Devices 250) directly using DHCP at the time the devices request a network address. In another embodiment, Customer Router 210 provides the DNS server address(es) to clients. The Customer Router may itself obtain the DNS server address from the Provider Hub or may be pre-configured to provide one of the addresses discussed above. In another embodiment, an external DHCP server provides the DNS server address to the clients.

In various embodiments, one or more devices is hard-coded or pre-configured to provide one of the addresses above. For example, the network configuration is such that the DNS server used is located at Service Provider 220, or at a DNS service provider and relayed via the Service Provider. When variables indicate failure of reachability to the Service Provider, an alternate DNS server may be specified (e.g., directly to DNS service provider, an alternate DNS service provider, a well-known public DNS server (e.g., Google's 8.8.8.8 DNS service), or an ISP or other service provider DNS server may be specified.

By way of further example, a DNS server other than one located at Service Provider 220, or DNS service provider and relayed via the Service Provider is used. When variables indicate failure of reachability to the DNS server used, an alternate DNS server may be specified (e.g., directly to DNS service provider, an alternate DNS service provider, a well-known public DNS server (e.g., Google's 8.8.8.8 DNS service), or an ISP or other service provider DNS server specified.

Use of the alternate DNS server may vary depending on the network architecture. For example, Provider Hub 211 performs the DNS resolution on behalf of clients (e.g., Customer Devices 201 and/or Provider Hub Customer Devices 250) which are given the Provider Hub's address as the DNS server via DHCP (from Provider Hub 211, Customer Router 210, or some other DHCP server). In this case, the Provider Hub uses the alternate address to perform DNS lookups on the client's behalf. In another case, clients are provided the DNS server address as part of the DHCP process. In that case, newly connected clients and those renewing their DHCP leases will obtain the new DNS server address. Note that short duration DHCP leases (e.g., 5 minutes) may be used as a mechanism to ensure that clients will be forced to renew their lease, more rapidly obtaining a new DNS server in the event of failure.

Customer Side: Use Alternate Network

In some embodiments, one or more devices on the customer network (e.g., Customer Device(s) 201, Customer Router 210, or Provider Hub 211) is connected to more than one network. In FIG. 4, the illustrated provider hub is an example of such a configuration. In that figure, the provider hub has access to Access Network(s) 230, in this case via Customer Router 210 and Access Device(s) 231. Additionally, Provider Hub 211 has access to Secondary Access Network(s) 241 via Secondary Access Device(s) 240. Other architectures are possible, including both networks being connected to the provider hub, networks where the customer router connects to the primary network via the provider hub but has a secondary network, networks where the customer router has both connections, and other architectures. Different devices featuring the secondary connection can be used.

When an entity detects that network failure or degradation has occurred, actions can be taken to make use of the secondary network. As described above, this may also be performed upon notification from the Service Provider 220 that it is no longer receiving communications from the device.

Prioritized List

In some embodiments, the user device equipped with one or more secondary networks maintains a prioritized list of which connections are preferred for use. For example, a Provider Hub 211 may have an Ethernet broadband connection, an LTE to another network provider, and a Wi-Fi connection to a consumer device with a separate network connection (e.g., a tablet that can provide a hotspot via Wi-Fi to the tablet's service provider). In this case, the device prefers to use them in that order. In the event a failure or degradation is indicated, the device will try the next connection on the list. If that one fails, the next connection will be attempted. In another embodiment, any earlier (higher priority) connections are re-tried before moving to a lower priority network. For example, if the Ethernet connection above fails, the device will try the LTE connection. If this also fails, the Ethernet connection may be retried before moving to the Wi-Fi connection.

Bonding of Network

In some embodiments, when a failure or degradation is detected, the secondary network is used in addition to, rather than in place of the primary network, as a bonded connection.

For example, multipath protocols (e.g., IETF MPTCP) or techniques (e.g., MPUDP) are used between the Provider Hub 211 and the traffic destination. These are used to send traffic for a single application and source/destination pair over multiple network paths simultaneously. By way of further example, (only) the primary network (e.g., Access Network(s) 230) is used unless variables indicating network performance indicate failure or degradation, in which case some or all traffic is routed over the secondary network (e.g., Secondary Access Network(s) 241). By way of additional example, both the primary and secondary network are used, but a much smaller fraction is sent using the secondary network unless variables indicate failure or degradation of the primary network, at which point an increasing portion (up to all) of the traffic is moved to the secondary network.

In various embodiments, this approach is combined with the prioritized list described above. If the primary network does not meet performance goals, the first secondary network is used to provide improved performance. If the bonded network is still not meeting performance criteria, additional networks from the list are bonded to improve performance.

Returning to Use Original Network

In some embodiments, variables being set and/or cleared in response to changes in the behavior of the original (primary) network are used to return to using the primary network. Method 500 in FIG. 5 illustrates an example part of this process. At step 530, variables have been set and/or cleared in response to failure or degradation of the network, and the process is monitoring the network to see if the problem has resolved. If the problem has resolved, appropriate variables are cleared and/or set at steps 540 and 550.

As described above, method 500 can be active (e.g., probing the network to see if it has improved) or passive (e.g., watching behavior of existing traffic). Method 500 can be triggered by events (e.g., observing traffic on a network after a period of no traffic, obtaining a link indication, etc.) or by polling periodically to check network behavior.

An embodiment of method 600 (FIG. 6) is a process that monitors variables used to indicate that a network has improved. If this process detects that those variables that indicate the network has improved are set and/or cleared at step 610, the pre-defined actions taken at step 620 will move to determine if traffic should be moved back to the primary network (based on configuration, user-preference, service provider preference, etc.).

For example, when (only) a primary and secondary network are in use, and when the primary network returns to functionality and/or exits the degraded state, traffic is again routed via the primary network, subject to user, service provider, or configuration settings.

By way of further example, each network on a prioritized list is periodically monitored, and if a higher priority network has returned to connectivity and/or improved from a degraded state, as indicated by variables, the higher priority network will again be used subject to user, service provider, or configuration settings.

By way of additional example, variables from other end customer devices in the same group as the primary network connection are used to help determine when to return to the primary network. If several other end customer devices in the same group (e.g., on the same ISP, on the same ISP access device, etc.) indicate that their primary network has returned, the system instructs the end customer to device to either return to the primary network or to test the primary network to potentially return to it.

When bonding is not used, returning to the primary network refers to routing all traffic over the primary network. In cases where bonding is used, the impact of improved performance variables for the primary (or any higher priority network) may be to remove a lower-priority bonded network, to route more traffic over the primary network, to cease bonding, or some combination of these actions.

Bonding can be performed using two or more networks (channels) to send data—split among the networks—resulting in greater (combined) bandwidth than one network alone. Bonding was described above in relation to FIG. 4.

The above techniques may be used to switch between two different secondary networks as well, in scenarios where more than one secondary network is employed. For clarity, switching back to the primary network is described, but this mechanism can also be used to move between different secondary networks. For example, a primary network, preferred secondary network, and back-up (less preferred) secondary network are connected. If both the primary and preferred secondary network are degraded or disabled, traffic may flow over the back-up secondary network. The mechanisms described above may be used to determine that the preferred secondary network has become available, not just to determine that the primary network has become available.

Testing Secondary Network(s)

In some embodiments, when variable(s) indicate degradation or failure of the primary network, the performance of one or more secondary networks is tested (e.g., via active probing or testing such as latency tests, speed tests, connectivity tests, etc.) before traffic is moved to one or more secondary network(s) or before one or more secondary network(s) is bonded to improve performance. This ensures that the networks are adequate or an improvement before moving traffic, and that moving to a secondary network does not reduce performance.

In various embodiments, active and/or passive monitoring is used for the primary network and one or more secondary network(s) at all times. Variable(s) are set and refreshed periodically, allowing decisions about switching and/or bonding secondary network(s) to be made immediately after variable indicate failure and/or degradation of the primary network, rather than waiting for active testing to be performed. Note that these tests may be active testing (such as latency tests, speed tests, connectivity tests, etc.), but if any traffic is flowing over the connections, such testing may also be performed passively or parasitically with existing traffic.

Alternatively or additionally, the primary network and/or other secondary network(s) may be tested (e.g., again, by active probing or testing such as latency tests, speed tests, connectivity tests, etc.) prior to moving traffic back to the primary network or changing the blend of traffic across a bonded connection.

Customer Interaction

In some embodiments, the end customer (user) is presented with the information related to variables set and/or cleared related to performance of the primary network and secondary network(s). The end customer can actively make decisions about when to switch automatically. Alternatively or additionally, the user is prompted to make the decision themselves when the network degrades below a certain level, and similarly is prompted to make the decision themselves to return when performance improves. Alternatively or additionally, the end user is able to adjust bonding parameters manually in response to information about degradation and/or failure of one or more networks, as conveyed by variable(s).

Alternate Data Center/Servers

In some embodiments, one or more variable(s) indicates a need to have end customer devices communicate with either a different server or with servers in a different data center location. This may be determined based on variables set by the end customer device, ISP, or intermediary, for example by noticing that the service is unreachable. This may also be determined by the service provider, for example via variable(s) indicating that a particular data center is undergoing maintenance or noticing that a particular customer has changed ISPs and a different server or data center would improve performance.

For example, variable(s) indicate that an end user device should move to a different server and/or data center. The determination is made by a device at or under control of the service provider. Instructions are sent to the end customer device directing it to move connections to the new data center and/or server. Alternatively or additionally, messages are sent to the data center and/or server the end customer device is currently associated with, instructing it to terminate the connection, forcing the end customer device to reconnect, potentially to a different data center and/or server.

By way of further example, variable(s) indicate that an end user device should move to a different server and/or data center. The determination is made by the end customer device, the end customer's ISP, or an intermediary device. The end user device connects to a second data center and/or server in response. The new server and/or data center may be pre-provisioned, or the end user device may contact the service provider in some way to determine the location for a new data center and/or server.

Alternate Mechanism for Device to Access Secondary Network

Figure 10:
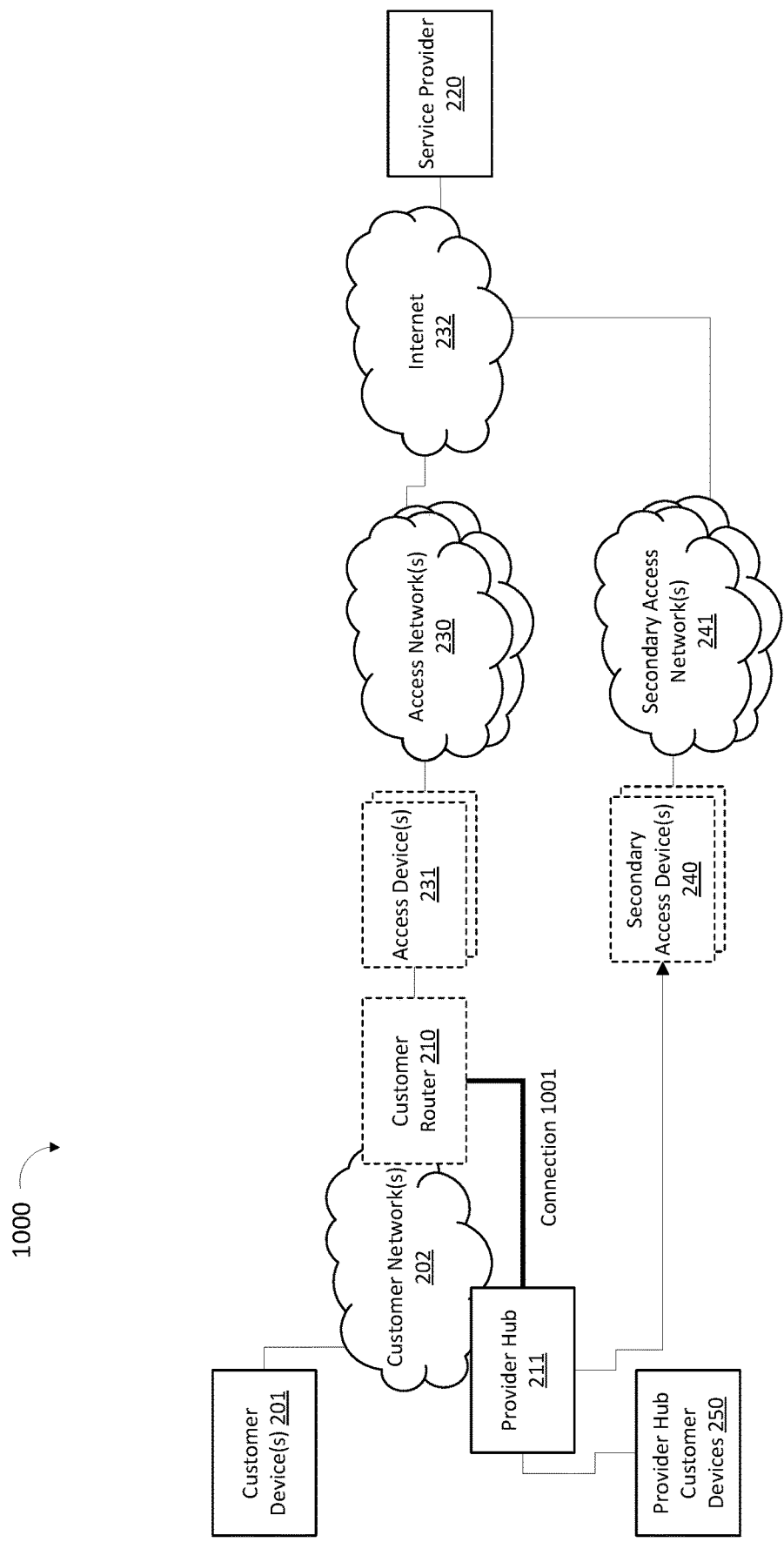
FIG. 10 is simplified block diagram of a network, according to various embodiments.

A device can connect to the secondary network in different ways. FIG. 10 is a block diagram showing architecture 1000 for performing secondary network connection that advantageously allows more end user devices to take advantage of the secondary network.

Architecture 1000 has at least some of the characteristics of architecture 400 of FIG. 4. Provider Hub 211 is "behind" the customer router with respect to the primary network (e.g., Access Networks 230 via Access Device(s) 231), but also has its own connection to Internet 232 via optional Secondary Access Device(s) 240 and Secondary Access Network(s) 241. In this case, some Customer Device(s) 201 may be connected to the customer router while others (e.g., Provider Hub Customer Devices 250) are connected via the provider hub. As described earlier in relation to FIG. 4, in this scenario, secondary network access via the secondary access network may be available only to provider hub customer devices, and not via customer devices.

In some embodiments, Provider Hub 211 is disposed "outside" the network. That is, having Customer Router 210 connect to Provider 211 to reach the primary Access Network(s) 230. However, end users may be unwilling to configure their network in this way.

In various embodiments, some other sort of connection allowing Customer Router 210 to access the secondary connection of Provider Hub 211, shown here as Connection 1001, is used. This connection may take several forms.

For example, Customer Router 210 incorporates a USB connection and logic to use the USB connection to connect a secondary network device. The customer router may be designed to allow a USB LTE modem to be connected and used as a secondary network. Because Service Provider 220 already provides Secondary Access Network 241 service via Provider Hub 211, it may not be desirable to purchase a USB LTE modem and connect it to the customer router.

Provider Hub 211 can include a USB connection, which is connected to Customer Router 210 over Connection 1001, in this case a USB connection. By emulating the behavior of a USB LTE modem (or other modem technology supported by the customer router), Provider Hub 211 can be used to provide backup network capabilities to the customer router.

In this scenario, both Provider Hub Customer Devices 250 and Customer Devices 201 are able to use the secondary network.

For example, USB On-the-Go (USBGO) is used to make Provider Hub 211 appear to be an LTE modem to Customer Router 210 when connected via USB.

By way of further example, the connection between Provider Hub 211 and Customer Router 210 is via Bluetooth (i.e., Connection 1001 is a Bluetooth connection), rather than USB. In various embodiments, Bluetooth is used as a data connection, allowing Customer Router 210 to access the secondary network connection (via Secondary Access Network(s) 241) offered by Provider Hub 211.

By way of additional example, the connection between Provider Hub 211 and Customer Router 210 is via a serial connection, (i.e., Connection 1001 is a (RS-232) serial connection) rather than USB. Alternatively or additionally, the connection between Provider Hub 211 and Customer Router 210 is via a Wi-Fi connection, (i.e., Connection 1001 is a Wi-Fi connection) rather than USB. In another embodiment, other commonly used connection technology is used for Connection 1001.

By way of further example, Provider Hub 211 presents itself over connection 1001 as a router for one network technology (e.g., LTE router) that Customer Router 210 is compatible with, while Secondary Access Network(s) 241 is actually a different network technology (for example, a secondary Ethernet broadband connection). In this way, the customer router can be used with any secondary network technology supported by Provider Hub 211.

By way of additional example, Connection 1001 is a wired connection, for example a USB, serial, or similar cable. In other cases, the connection is a wireless connection (e.g., Bluetooth; Wi-Fi; or wireless connections for USB, serial, or similar connection).

Additional Mechanisms for Provider Hub to Access Secondary Network

In some embodiments, Provider Hub 211 provides one external Ethernet port, which is used to connect to an access network, and provides several internal Ethernet ports, typically used to connect Provider Hub Customer Devices 250. If Provider Hub 211 is the external device, as illustrated in FIG. 2, the external Ethernet port is used to connect to Access Device(s) 231 to connect to Access Network(s) 230. If instead Provider Hub is internal to Customer Router 210, as illustrated by FIG. 4, the external Ethernet port connects to Customer Router 210 via Customer Network(s) 202.

In various embodiments, one or more of the internal Ethernet ports may be reconfigured (e.g., by Service Provider 220, automatically, or by the end user) to be used to access a secondary network. That is, rather than providing a connection to Provider Customer Devices 250, one or more internal Ethernet port(s) is reconfigured to connect to a Secondary Access Network(s) 241, via a Secondary Access Device(s) 240. This advantageously can eliminate the need for a dedicated secondary network Ethernet connection, or allows for additional secondary network(s) to be connected.

Figure 11:
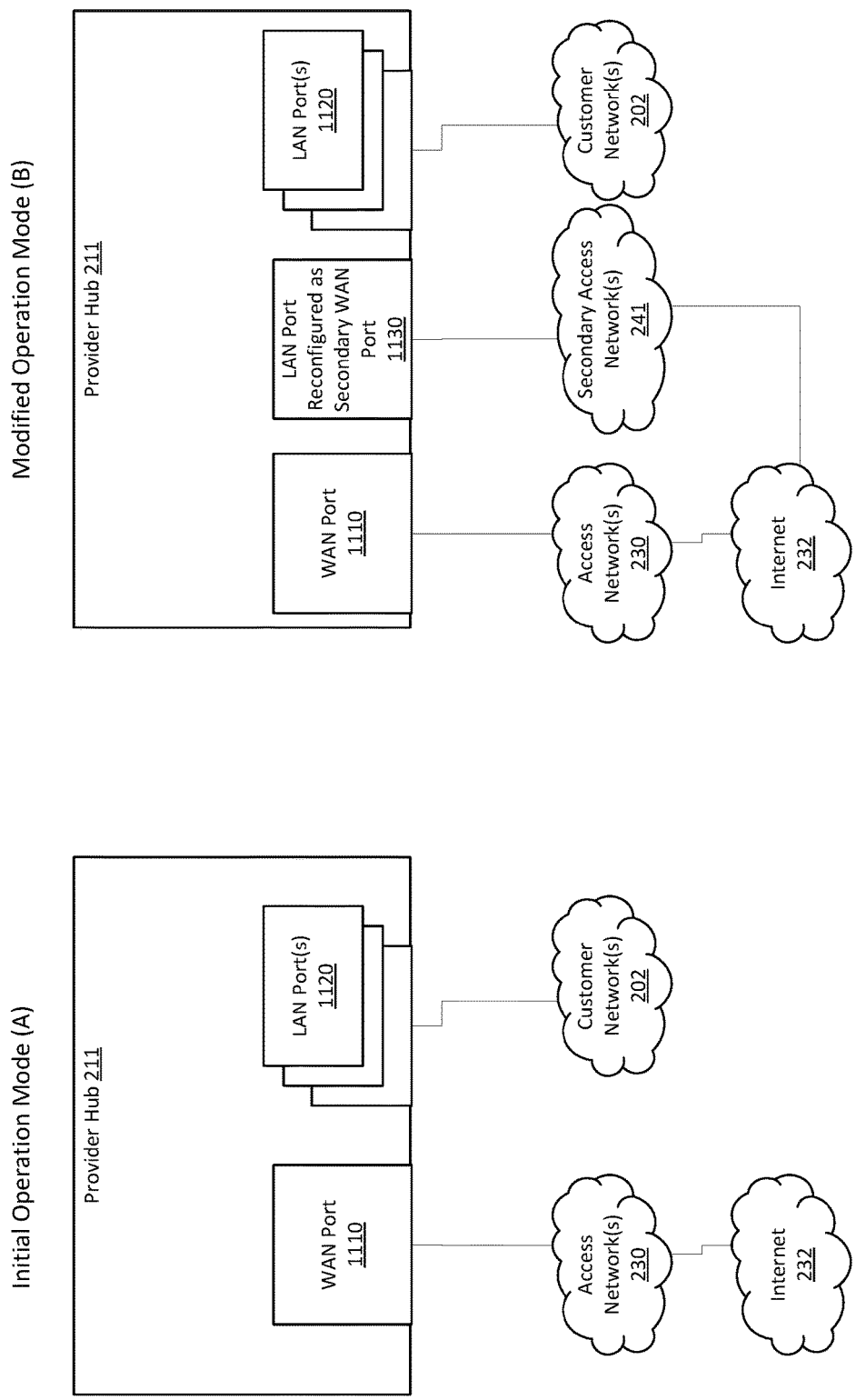
FIG. 11 is simplified block diagram of various hub network architectures, in accordance with some embodiments.

FIG. 11 illustrates this scenario. On the left, a block diagram for initial operation mode (A) of the Provider Hub 211 is illustrated. Here, a WAN Port 1110 is connected to the Primary Access Network(s) 230, and on to Internet 232 (for simplicity, Access Device(s) 231, Customer Router(s) 210 etc. are not depicted). LAN Port(s) 1120 are connected to the Customer Network(s) 202, for example the user's LAN.

On the right of FIG. 11 a second scenario, for modified operation mode (B) is depicted. In this scenario, the user and/or the Service Provider 220 has reconfigured one of the LAN ports 1120 to instead be a Secondary WAN Port (LAN Port Reconfigured as Secondary WAN Port 1130). This Secondary WAN Port connects to the Internet 232 via Secondary Access Network(s) 241.

Figure 12:
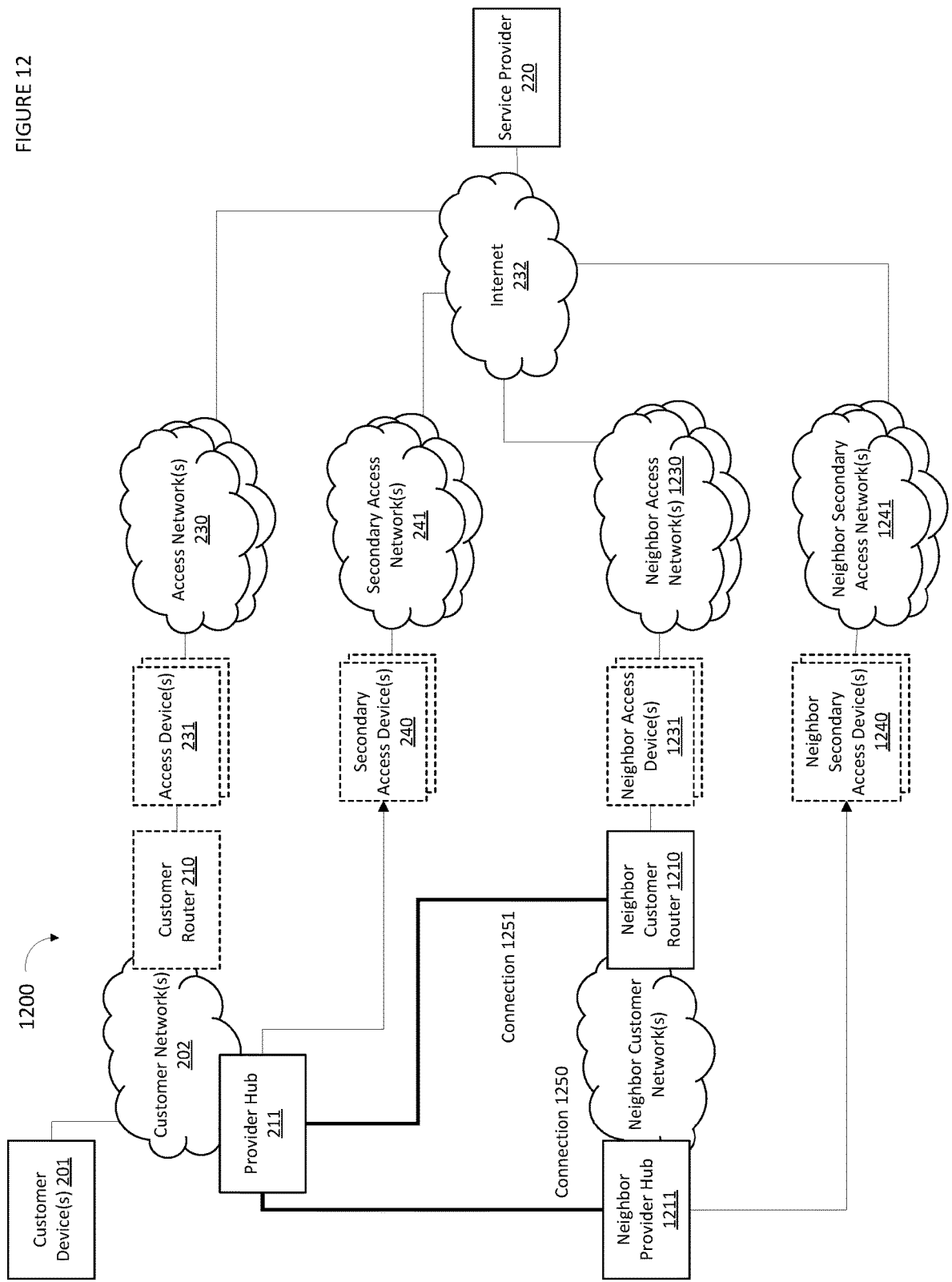
FIG. 12 is simplified block diagram of a network, in accordance with various embodiments.

According to some embodiments, access is provided via a neighbor or neighboring businesses' network connection(s). FIG. 12 illustrates a deployment diagram (system) 1200 where a Provider Hub 211 accesses a nearby neighbor(s) (or neighboring businesses) that are also customers of Service Provider 220 and have a Provider Hub 211 to access a secondary network.

The neighbor can have some different combination of networks—that is, one or more of Access Network(s) 230 and Secondary Access Network(s) 241 differs between the end customer and their neighbor. Here this is illustrated by showing Neighbor Provider Hub 1211, connected to Neighbor Secondary Access Network(s) 1241 via Neighbor Secondary Access Device(s) 1240; and Neighbor Customer Router 1210 connected to Neighbor Access Network(s) 1230 via Neighbor Access Device(s) 1231. Note that at least one of the Neighbor Access Network(s) 1230 and/or Neighbor Secondary Access Network(s) 1241 differ from Access Network(s) 230 and Secondary Access Network(s) 241 (or there is no Secondary Access Network(s) 241), providing an additional connection option via one of the neighbors connections.

Neighbors can have an incentive to share the connection if they are allowed to use other neighbors' connections as well. Credential information and management is accomplished and managed by Service Provider 220.

Provider Hub 211 can be connected to Neighbor Provider Hub 1211 (via Connection 1250) and/or to Neighbor Customer Router 1210 (via Connection 1251).

In some embodiments, Provider Hub 211 is connected to Neighbor Provider Hub 1211 via Connection 1250. Connection 1250 can be a wireless connection. For example, this is simply achieved by Service Provider 220 providing appropriate (e.g., shared and secured to prevent other use of information between customers) connection credentials with Provider Hub 211, allowing a wireless connection be made similarly to any other client of Neighbor Provider Hub 1211. Additional controls, such as MAC based access control may be employed to ensure the connection is only used when permitted by Service Provider 220, for example during an outage of all other networks available to Provider Hub 211. By way of further example, Connection 1250 is a direct Ethernet or other wired connection (e.g., serial, network over power, etc.), with Provider Hub 211 managing the connection. This may be achieved, for example with a second secondary Ethernet connection, or by using one of the internal Ethernet connections, as described earlier.

Similarly, for a Wi-Fi or Ethernet connection, this connection could be directly to Neighbor Customer Router 1210, via Connection 1251. Note that assuming the Neighbor Customer Router 1210 is unmodified, this can be a regular connection, as the router may not support specialized connections or protocols. Additionally, Neighbor Secondary Access Network(s) 1241 may not be accessible in this scenario, as they are connected to Neighbor Provider Hub 1211.

In various embodiments, a special connection (e.g., not a regular network connection) is established between Provider Hub 211 and Neighbor Provider Hub 1211. This connection may be over either a wired (e.g., Ethernet, network over powerline, serial etc.) or wireless connection (e.g., Wi-Fi, Bluetooth, microwave, etc.), but can be specially managed to allow more control over access by Provider Hub 211 to Neighbor Provider Hub 1211's networks. Again, access and control may be managed by Service Provider 220.

Figure 13:
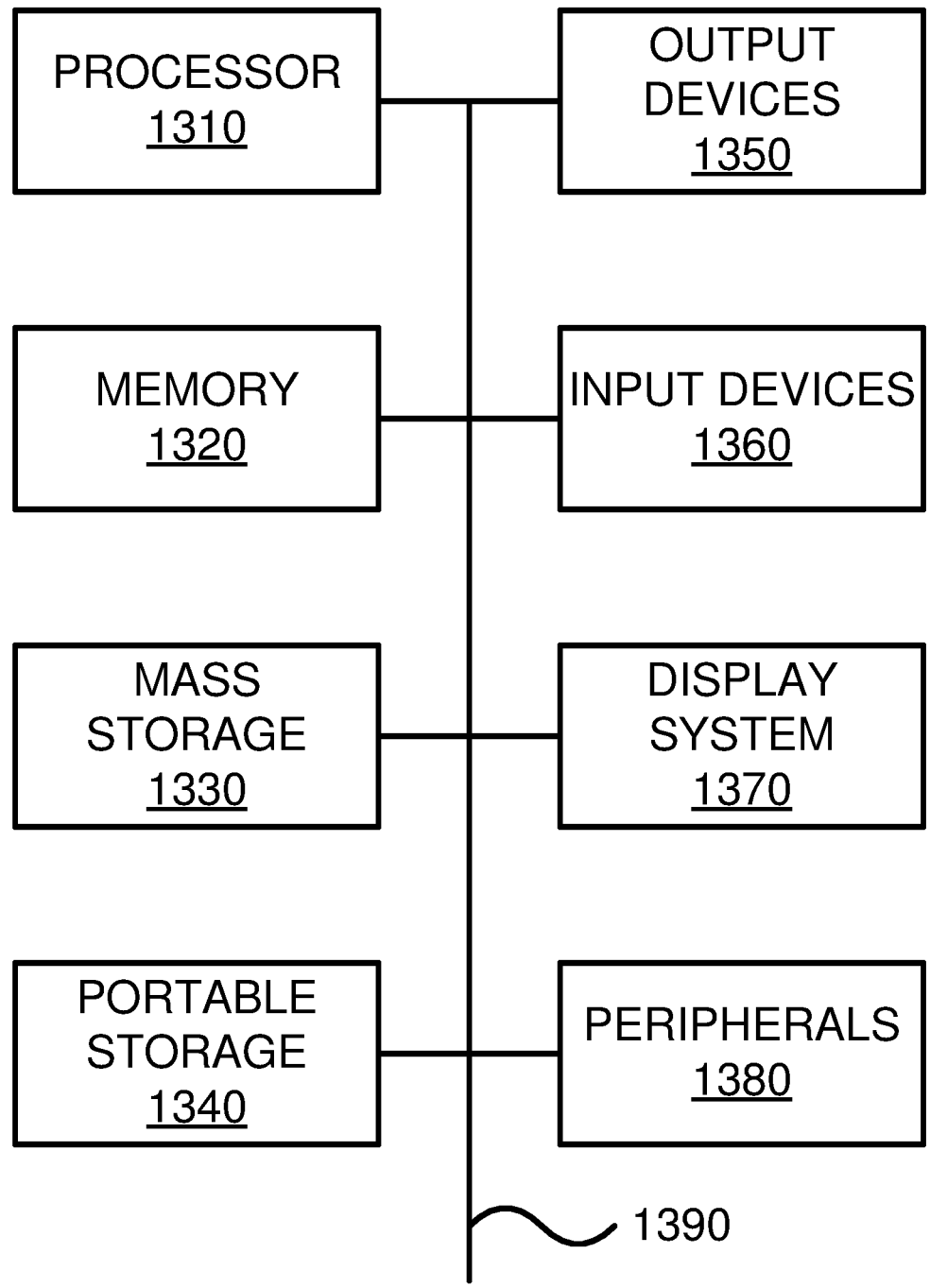
FIG. 13 is a simplified block diagram of a computing system, according to some embodiments.

FIG. 13 illustrates an exemplary computer system 1300 that may be used to implement some embodiments of the present invention. The computer system 1300 in FIG. 13 may be implemented in the contexts of the likes of computing systems, networks, servers, or combinations thereof. The computer system 1300 in FIG. 13 includes one or more processor unit(s) 1310 and main memory 1320. Main memory 1320 stores, in part, instructions and data for execution by processor unit(s) 1310. Main memory 1320 stores the executable code when in operation, in this example. The computer system 1300 in FIG. 13 further includes a mass data storage 1330, portable storage device 1340, output devices 1350, user input devices 1360, a graphics display system 1370, and peripheral device(s) 1380.

The components shown in FIG. 13 are depicted as being connected via a single bus 1390. The components may be connected through one or more data transport means. Processor unit(s) 1310 and main memory 1320 are connected via a local microprocessor bus, and the mass data storage 1330, peripheral device(s) 1380, portable storage device 1340, and graphics display system 1370 are connected via one or more input/output (I/O) buses.

Mass data storage 1330, which can be implemented with a magnetic disk drive, solid state drive, or an optical disk drive, is a non-volatile storage device for storing data and instructions for use by processor unit(s) 1310. Mass data storage 1330 stores the system software for implementing embodiments of the present disclosure for purposes of loading that software into main memory 1320.

Portable storage device 1340 operates in conjunction with a portable non-volatile storage medium, such as a flash drive, floppy disk, compact disk, digital video disc, or Universal Serial Bus (USB) storage device, to input and output data and code to and from the computer system 1300 in FIG. 13. The system software for implementing embodiments of the present disclosure is stored on such a portable medium and input to the computer system 1300 via the portable storage device 1340.

User input devices 1360 can provide a portion of a user interface. User input devices 1360 may include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, the computer system 1300 as shown in FIG. 13 includes output devices 1350. Suitable output devices 1350 include speakers, printers, network interfaces, and monitors.

Graphics display system 1370 include a liquid crystal display (LCD) or other suitable display device. Graphics display system 1370 is configurable to receive textual and graphical information and processes the information for output to the display device.

Peripheral device(s) 1380 may include any type of computer support device to add additional functionality to the computer system.

The components provided in the computer system 1300 in FIG. 13 are those typically found in computer systems that may be suitable for use with embodiments of the present disclosure and are intended to represent a broad category of such computer components that are well known in the art. Thus, the computer system 1300 in FIG. 13 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1300 may be implemented as a cloud-based computing environment, such as a virtual machine operating within a computing cloud. In other embodiments, the computing system 1300 may itself include a cloud-based computing environment, where the functionalities of the computing system 1300 are executed in a distributed fashion. Thus, the computing system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1300, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media can include coaxial cables, copper wire and fiber optics, among others, including the wires that comprise a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of the present technology may be written in any combination of one or more programming languages, including an object oriented programming language such as JAVA, SMALLTALK, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for communications network failure detection and remediation comprising:
 receiving first communications using a network from a first client, the first communications including a telephone number, location, and security credential, the telephone number, location, and security credential each being associated with a first user of the first client;
 authenticating the first user of the first client using the telephone number and the security credential;
 creating, responsive to the authenticating, a registration for the first client in a registration database, the registration including the location from the first communications from the first client, the registration being used to route second communications directed to the telephone number of the first client from a second client;
 establishing, responsive to the authenticating, a connection to the first client within the network;
 detecting the connection to the first client has failed, the detecting comprising:
  measuring a time period during which the first client does not send communications traffic; and
  determining the measured time period exceeds a limit, the limit being an amount of time after which it is unlikely a valid connection is idle, the limit being produced by a statistical model; and
 removing, responsive to the detecting, the registration for the first client from the registration database.

2. The computer-implemented method of claim 1, wherein the connection is a virtual private network connection.

3. The computer-implemented method of claim 1, wherein detecting further comprises:
 determining the measured time period exceeds a limit, the limit being a pre-determined value received from a system administrator.

4. The computer-implemented method of claim 1, wherein the detecting comprises:
 measuring a time period during which a keep alive communication is not received from the first client; and
 determining the measured time period exceeds a limit, the limit being a pre-determined value received from a system administrator.

5. The computer-implemented method of claim 1, wherein the detecting comprises:
 sending an Address Resolution Protocol (ARP) request to the first client;
 measuring a time period from the sending during which a communication responsive to the ARP request is not received from the first client; and
 determining the measured time period exceeds a limit, the limit being a pre-determined value received from a system administrator.

6. The computer-implemented method of claim 1, wherein the detecting comprises:
 ascertaining a registration message is not received from the first client before an expiration of the registration.

7. The computer-implemented method of claim 1, the method further comprising:
 receiving periodic communications from the first client at a predetermined time interval; and
 wherein the detecting comprises:
  measuring a first time period during which the periodic communications are not received from the first client; and
  determining the measured time period exceeds at least one of the predetermined time interval and a predetermined value received from a system administrator.

8. The computer-implemented method of claim 1, the method further comprising at least one of:
 notifying the first user of the first client of the detected connection failure using at least one of email, text message, telephone call, and push notification;
 notifying a monitoring center of the detected connection failure; and
 notifying the first client.

9. A system for communications network failure detection and remediation comprising:
 a server, the server including:
  a processor; and
  a memory communicatively coupled to the processor, the memory storing instructions executable by the processor to perform a method comprising:
   receiving first communications using a network from a first client, the first communications including a telephone number, location, and security credential, the telephone number, location, and security credential each being associated with a first user of the first client;
   authenticating the first user of the first client using the telephone number and the security credential;
   creating, responsive to the authenticating, a registration for the first client in a registration database, the registration including the location from the first communications from the first client, the registration being used to route second communications directed to the telephone number of the first client from a second client;
   establishing, responsive to the authenticating, a connection to the first client within the network;
   detecting the connection to the first client has failed, the detecting comprising:
    measuring a time period during which the first client does not send communications traffic; and
    determining the measured time period exceeds a limit, the limit being an amount of time after which it is unlikely a valid connection is idle, the limit being produced by a statistical model; and
   removing, responsive to the detecting, the registration for the first client from the registration database.

10. The system of claim 9, wherein the connection is a virtual private network connection.

11. The system of claim 9, wherein detecting further comprises:
 determining the measured time period exceeds a limit, the limit being a pre-determined value received from a system administrator.

12. The system of claim 9, wherein the detecting comprises:
 measuring a time period during which a keep alive communication is not received from the first client; and
 determining the measured time period exceeds a limit, the limit being a pre-determined value received from a system administrator.

13. The system of claim 9, wherein the detecting comprises:
 sending an Address Resolution Protocol (ARP) request to the first client;
 measuring a time period from the sending during which a communication responsive to the ARP request is not received from the first client; and determining the measured time period exceeds a limit, the limit being a pre-determined value received from a system administrator.

14. The system of claim 9, wherein the detecting comprises:
ascertaining a registration message is not received from the first client before an expiration of the registration.

15. The system of claim 9, the method further comprising:
receiving periodic communications from the first client at a predetermined time interval; and
wherein the detecting comprises:
measuring a first time period during which the periodic communications are not received from the first client; and
determining the measured time period exceeds at least one of the predetermined time interval and a predetermined value received from a system administrator.

16. A system for communications network failure detection and remediation comprising:
means for receiving first communications using a network from a first client, the first communications including a telephone number, location, and security credential, the telephone number, location, and security credential each being associated with a first user of the first client;
means for authenticating the first user of the first client using the telephone number and the security credential;
means for creating, responsive to the authenticating, a registration for the first client in a registration database, the registration including the location from the first communications from the first client, the registration being used to route second communications directed to the telephone number of the first client from a second client;
means for establishing, responsive to the authenticating, a connection to the first client within the network;
means for detecting the connection to the first client has failed, the means for detecting comprising:
means for measuring a time period during which the first client does not send communications traffic; and
means for determining the measured time period exceeds a limit, the limit being an amount of time after which it is unlikely a valid connection is idle, the limit being produced by a statistical model; and
means for removing, responsive to the detecting, the registration for the first client from the registration database.

17. The computer-implemented method of claim 1, wherein the location comprises an IP address.

18. The computer-implemented method of claim 1, wherein the security credential comprises one of a password and a certificate.

19. The system of claim 9, wherein the location comprises an IP address.

20. The system of claim 9, wherein the security credential comprises one of a password and a certificate.

* * * * *